United States Patent [19]
Sato et al.

[11] Patent Number: 5,252,367
[45] Date of Patent: Oct. 12, 1993

[54] METHOD OF MANUFACTURING A MAGNETIC RECORDING MEDIUM

[75] Inventors: Motoharu Sato; Kazuo Muramtasu; Yoshihiko Onishi, all of Kobe, Japan; Hidetaka Hayashi, Saratoga, Calif.

[73] Assignee: Kabushiki Kaisha Kobe Seiko Sho, Kobe, Japan

[21] Appl. No.: 688,555

[22] PCT Filed: Oct. 26, 1990

[86] PCT No.: PCT/JP90/01386
§ 371 Date: Jun. 26, 1991
§ 102(e) Date: Jun. 26, 1991

[87] PCT Pub. No.: WO91/06948
PCT Pub. Date: May 16, 1991

[30] Foreign Application Priority Data

Oct. 27, 1989 [JP] Japan ................................ 1-280480
Mar. 23, 1990 [JP] Japan ................................ 2-73924
Mar. 23, 1990 [JP] Japan ................................ 2-73925
Mar. 23, 1990 [JP] Japan ................................ 2-73926

[51] Int. Cl.$^5$ ........................................ B05D 3/14
[52] U.S. Cl. ........................... 427/599; 427/130; 427/131; 427/132; 427/294; 427/350; 427/374.6; 427/404; 428/64; 428/695; 428/900; 428/928
[58] Field of Search .............. 427/127-132, 427/48, 294, 350, 374.6, 404, 599; 428/694, 64, 695, 900, 928

[56] References Cited
FOREIGN PATENT DOCUMENTS
62-234232 10/1987 Japan .

Primary Examiner—Bernard Pianalto
Attorney, Agent, or Firm—Oblon, Spivak, McClelland, Maier & Neustadt

[57] ABSTRACT

A method of manufacturing a magnetic recording medium such as for a magnetic disc, in which a magnetic layer comprising a Co-based alloy is formed on a carbon substrate and a heat treatment is applied at a temperature of 250° to 1450° C. to improve the coercive force. Further, the squareness ratio is improved by applying the heat treatment under a magnetic field. Greater coercive force can be obtained by forming a Cr underlayer prior to the formation of the magnetic layer. Increased recording density of the magnetic recording medium can be realized by improving the coercive force and the squareness ratio in this way.

20 Claims, 21 Drawing Sheets

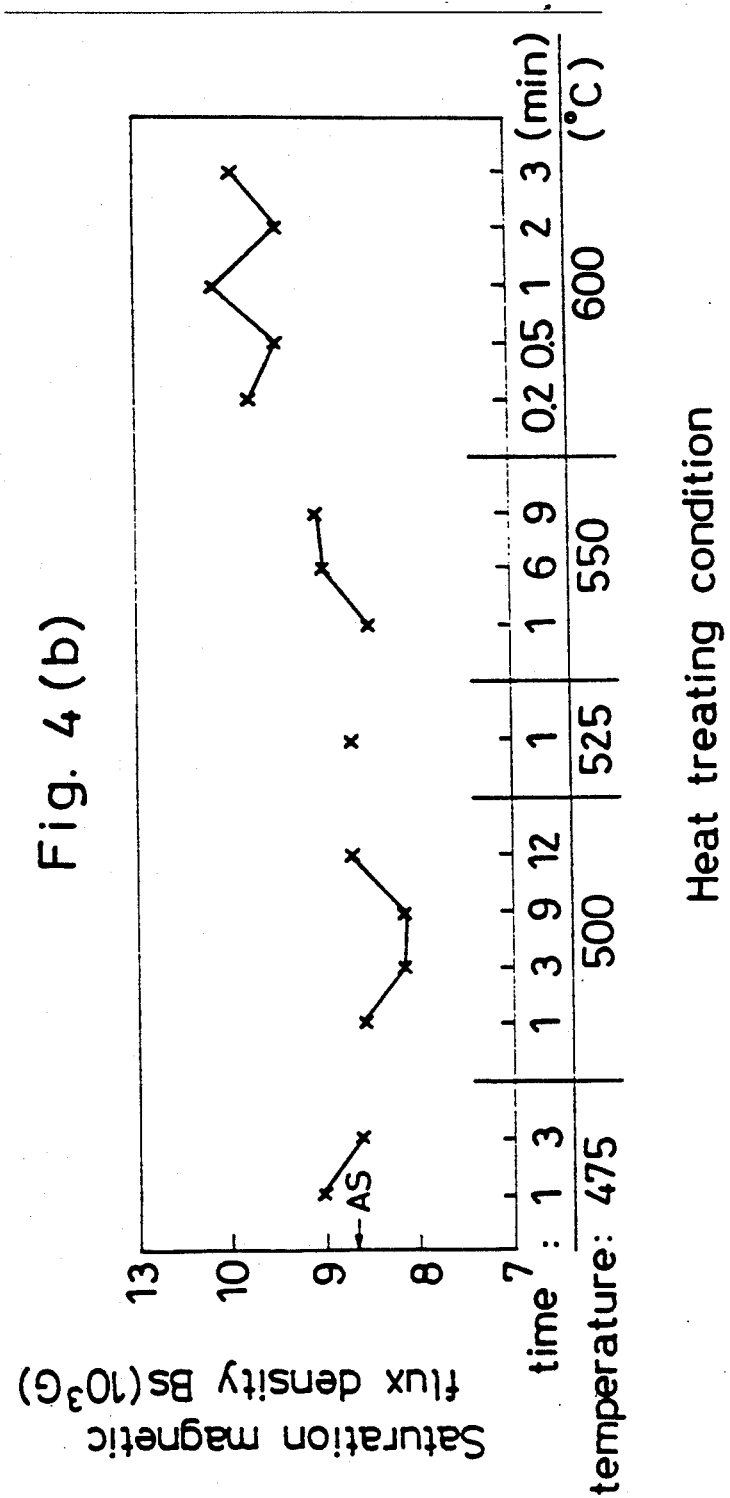

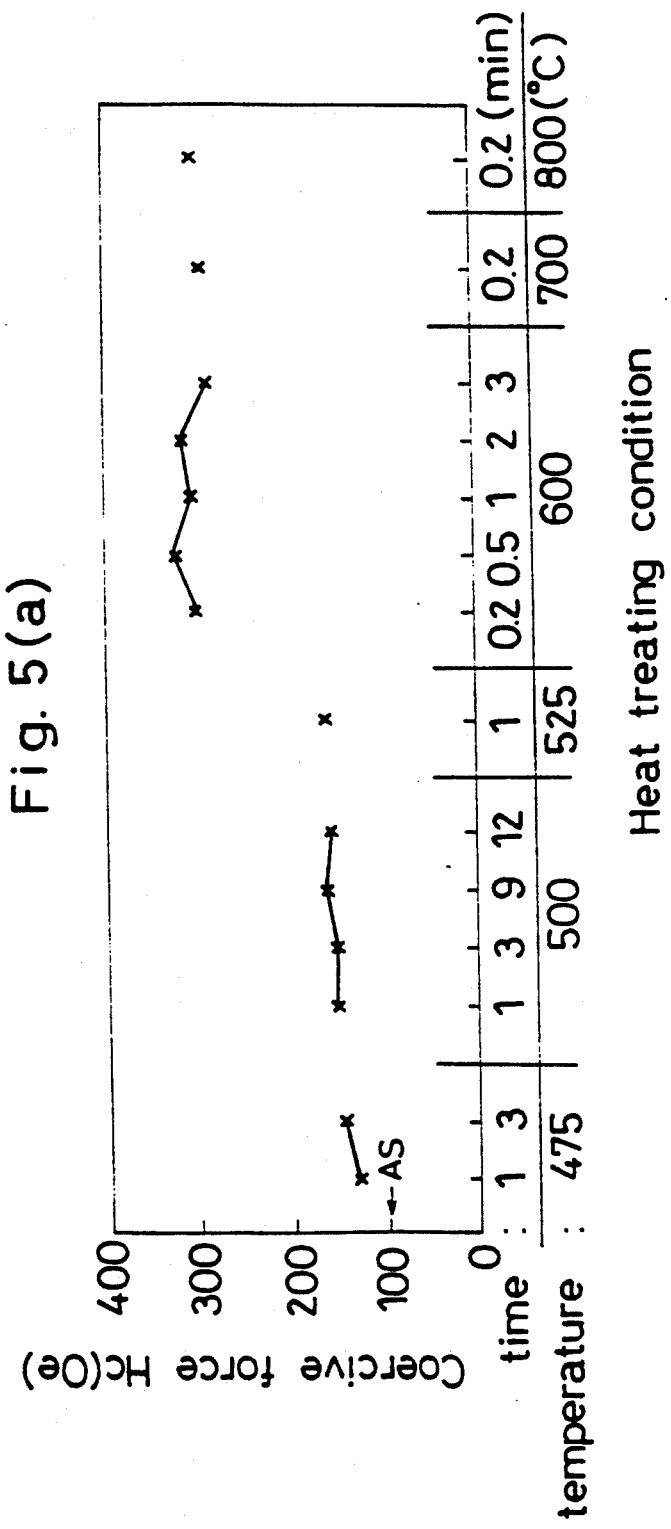

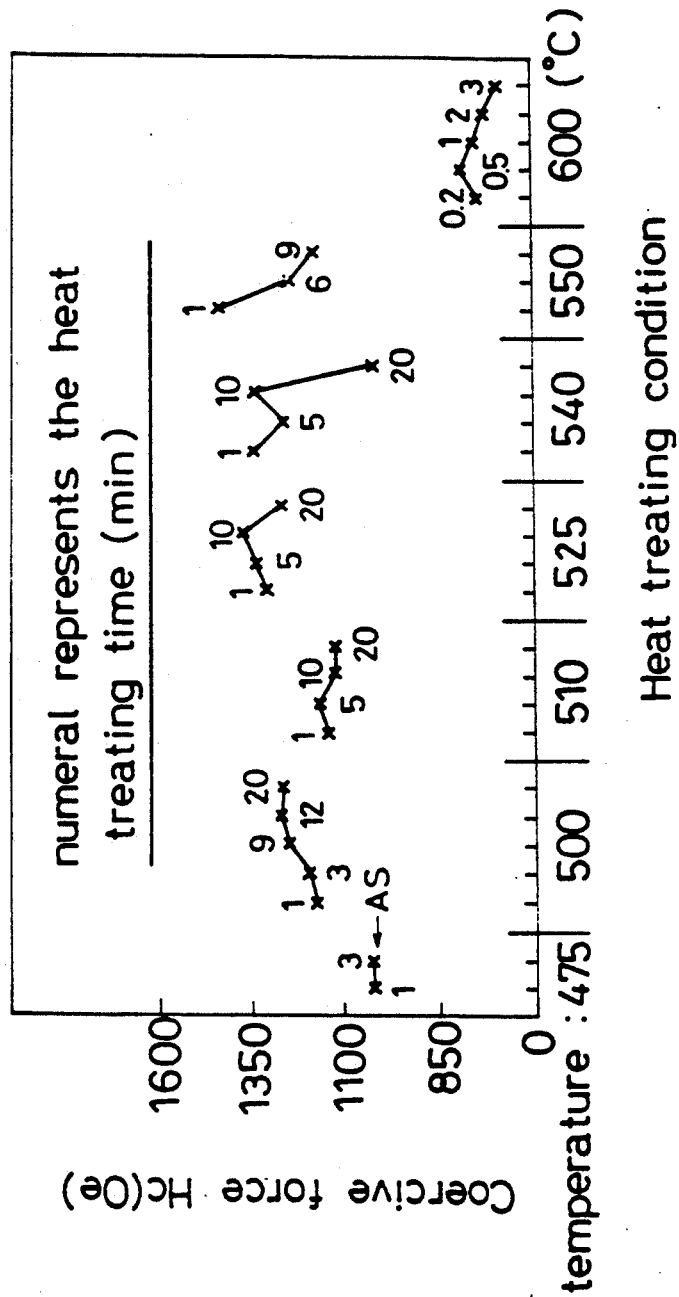

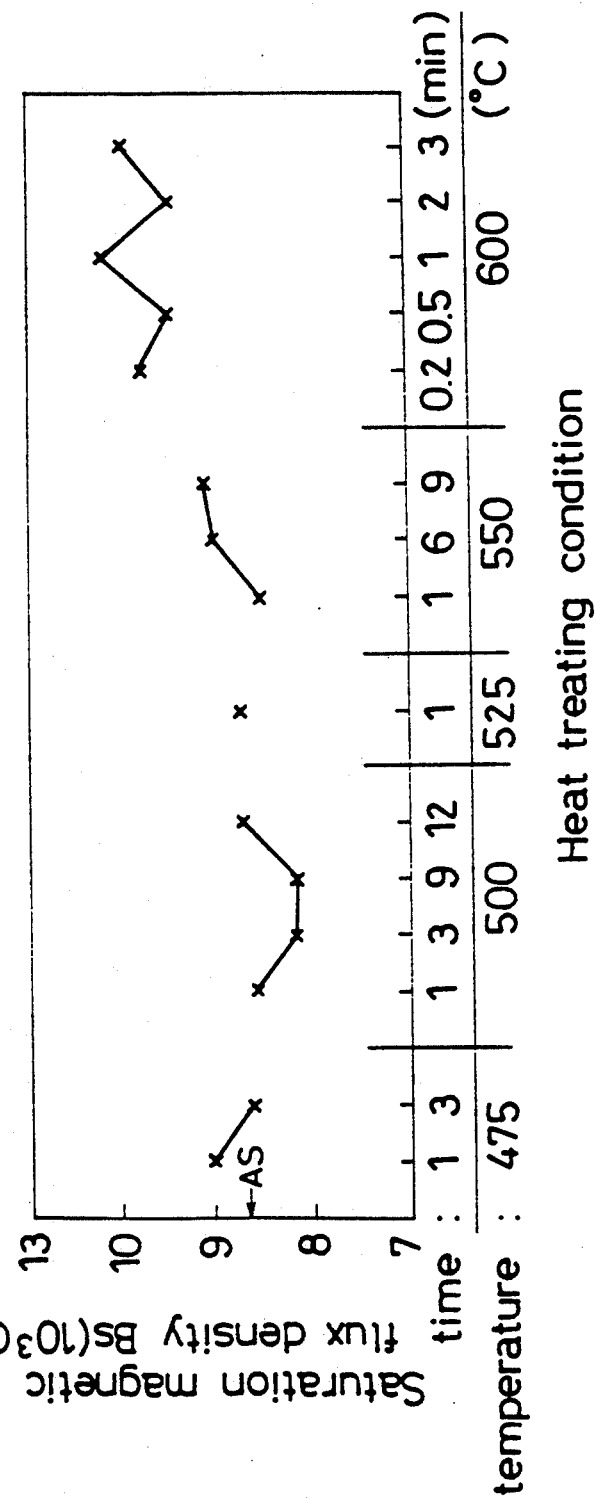

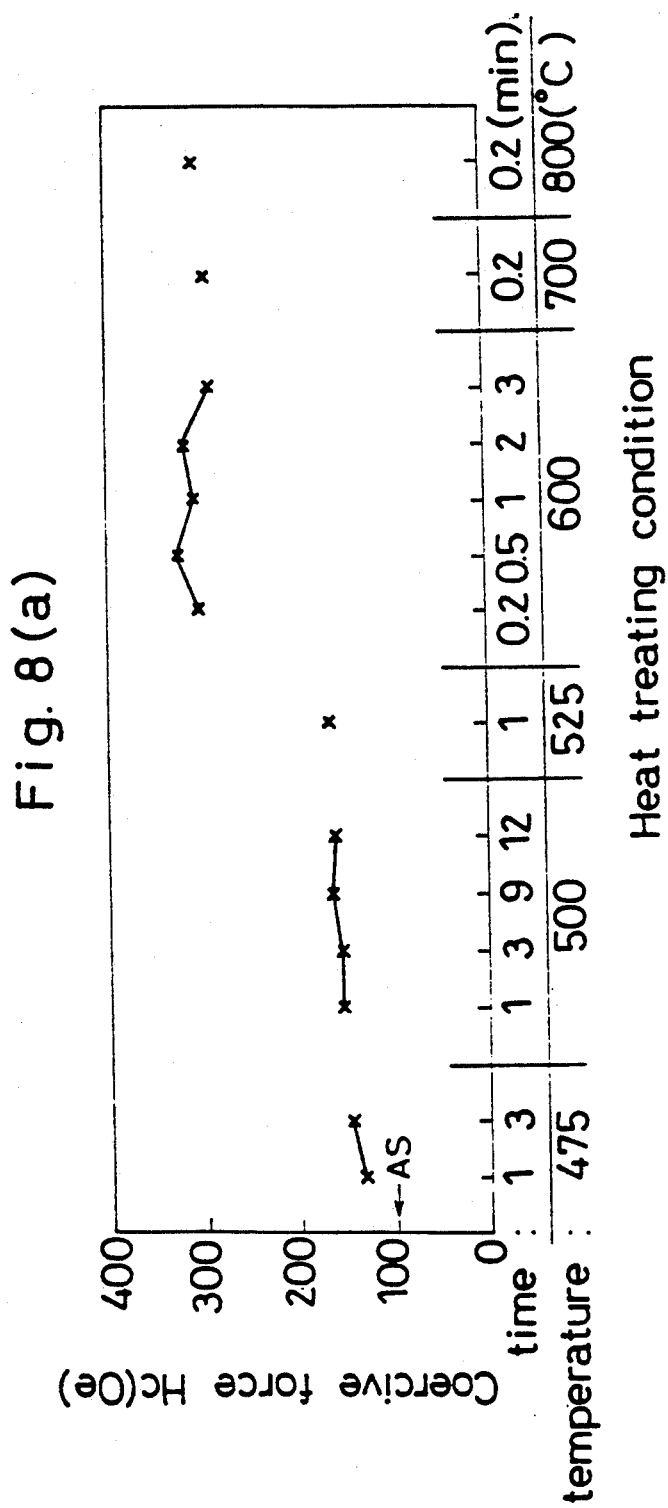

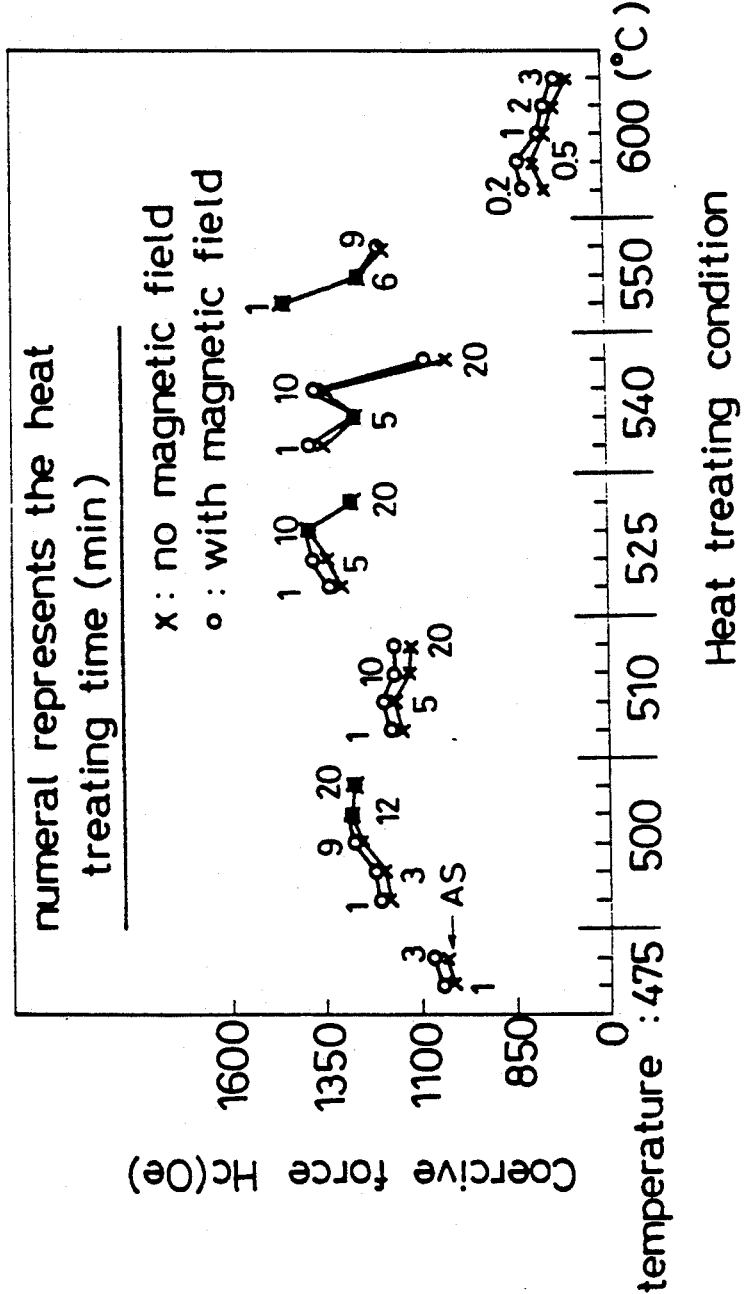

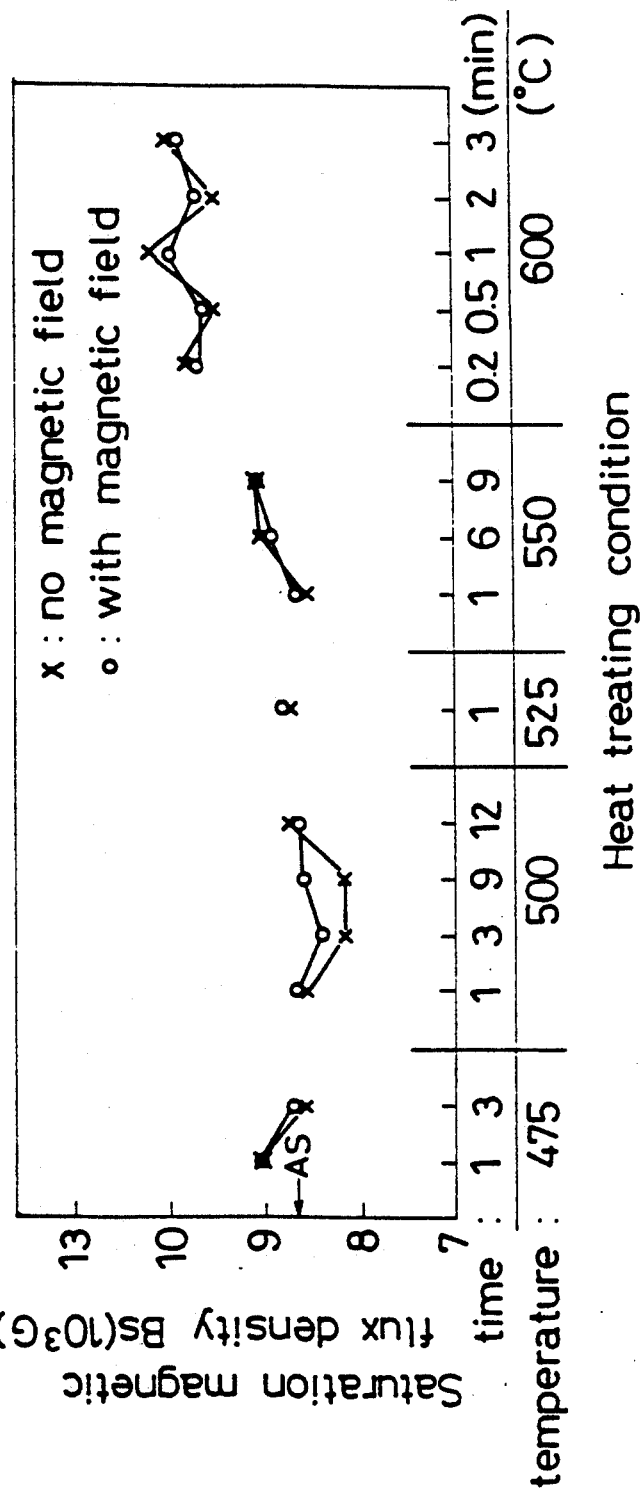

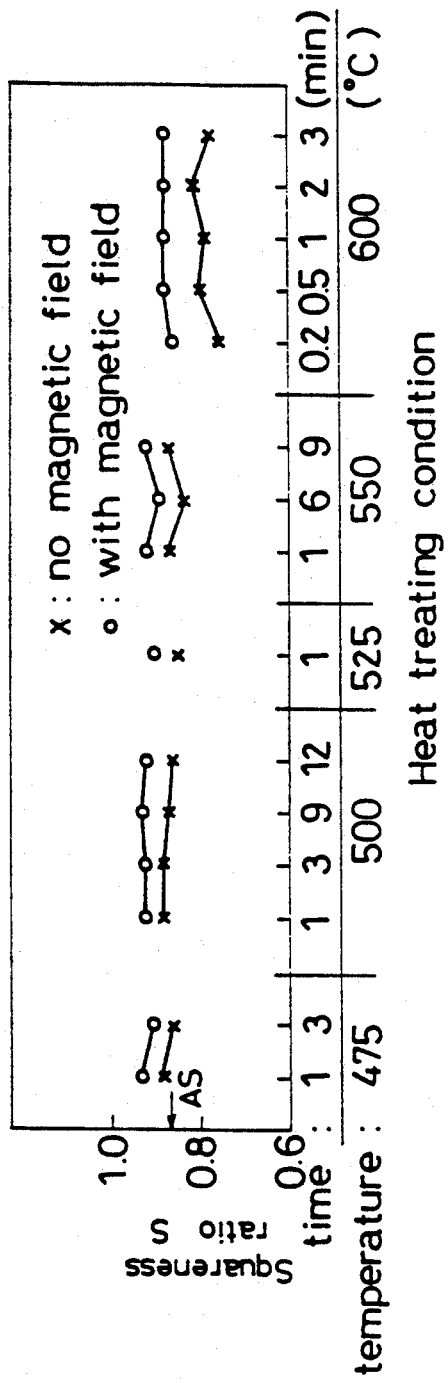
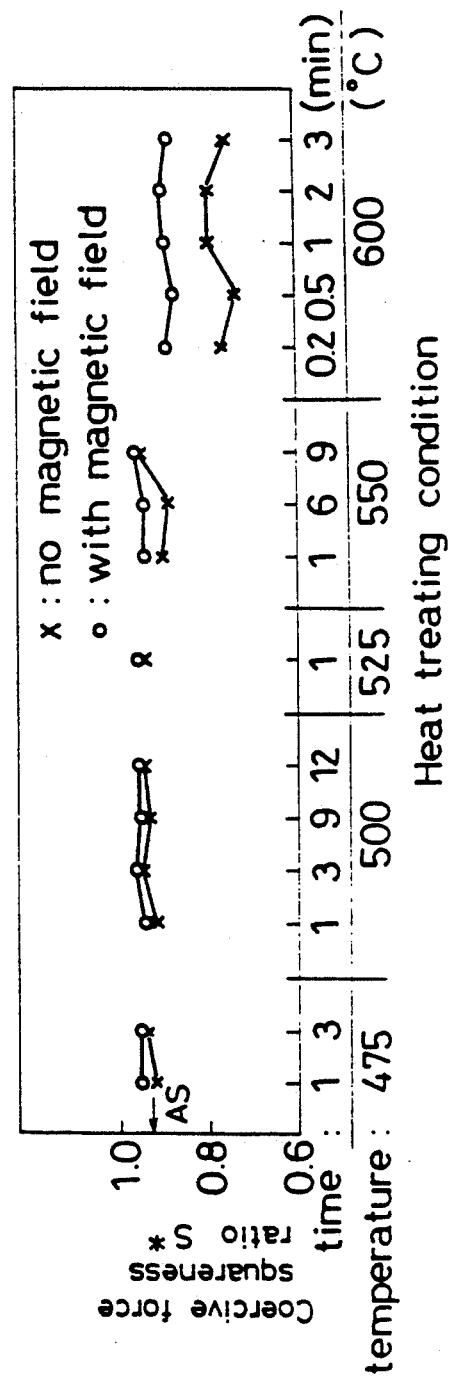

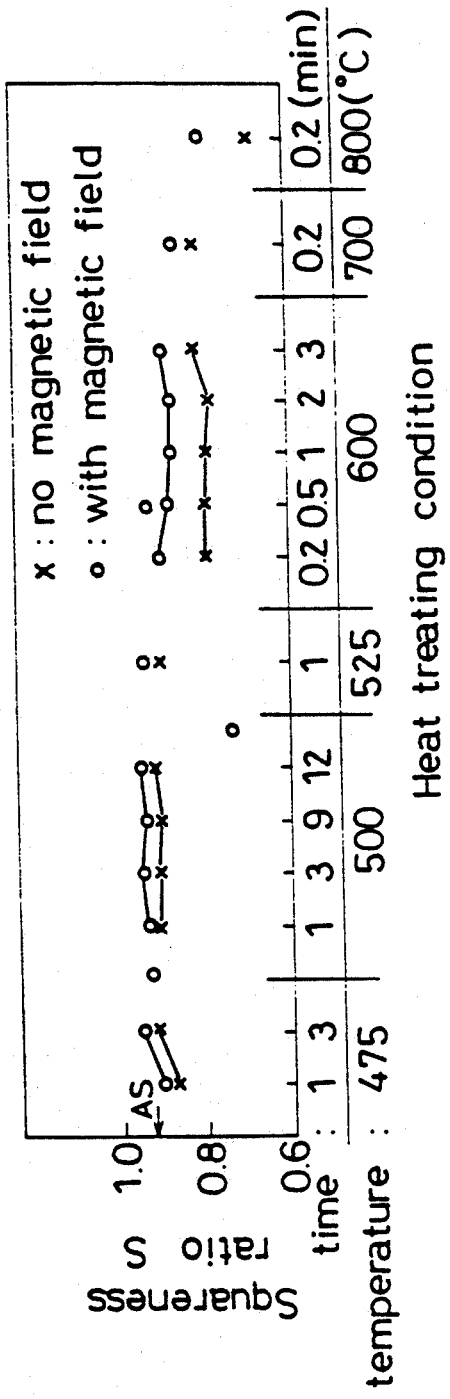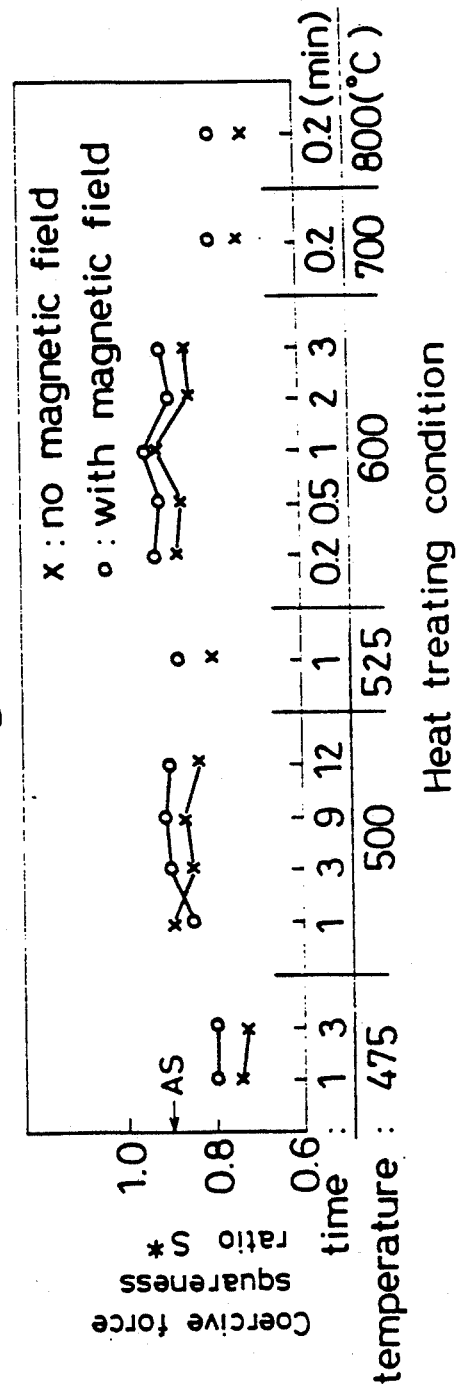

METHOD OF MANUFACTURING A MAGNETIC RECORDING MEDIUM

TECHNICAL FIELD

The present invention concerns a method of manufacturing a magnetic recording medium, for example, used for a magnetic disc device and, more in particular, it relates to a method of manufacturing a magnetic recording medium capable of remarkably improving the recording density.

BACKGROUND ART

In the magnetic recording media such as used for magnetic discs, development is now under progress for making the recording density higher and it is known that the value for the magnetization transition width ($\mu$m) a represented by the following equation (1) has to be decreased in order to improve the recording density.

$$a \propto \delta \cdot Br/(m \cdot Hc) \tag{1}$$

where $\delta$ represents the thickness ($\mu$m) of a magnetic layer, Br represents the residual magnetic flux density (G), m represents a factor regarding the squareness and Hc represents the coercive force (Oe).

Accordingly, for improving the magnetic density, it is an effective means for improving the coercive force together with the reduction of the thickness for the magnetic layer.

By the way, the magnetic recording media are generally classified into three types, i.e., (1) a coating type, (2) a plated thin film type and (3) a sputtered thin film type depending on the difference of the manufacturing method, and improvement for the coercive force has been tried to each of the cases as shown below.

The coating type medium (1) is a magnetic recording medium prepared by coating and baking acicular $\gamma$-Fe$_2$O$_3$ magnetic particles mixed with a binder and the like on an aluminum alloy substrate and, for the improvement of the coercive force, it has been employed a method, for example, of refining the acicular magnetic particles or depositing Co to the surface thereof.

Further, the plated thin film type medium (2) is prepared by forming a magnetic layer such as Co-P or Co-Ni-P by means of an electroless plating method on a substrate comprising an aluminum alloy substrate (hereinafter referred to as NiP plated substrate), in which improvement is intended for the coercive force by the improvement of the plating bath composition.

However, it is difficult to reduce the film thickness in the coating type medium (1), while no satisfactory increase in the recording density has yet been attained in the plated thin film type medium (2) above and, afterall, expectation has been made to the method of forming the magnetic layer by means of the sputtering method (3) above.

As the sputtering type thin film medium, those prepared by forming a magnetic layer such as Co-Ni-Cr or Co-Ni by means of sputtering on a NiP plated substrate is ordinary, and improvement for the magnetic composition has been attempted as a means for improving the coercive force. Further, there have also been proposed a method of forming a film of a magnetic layer in a state where the temperature of the substrate is elevated (for example, in the Summary of The Academic Lecture of the Eleventh Meeting of The Applied Magnetic Society of Japan by Ishikawa, et al, p 18, 1987, 11), and a method of optimizing the conditions for forming the magnetic layer by applying a reverse bias voltage to a substrate (for example, in the Preprint for the Associated Lecture of 35th Applied Physics Society, by Hashimoto et al, p 57, 1988, 10).

However, even in the sputtering thin film type medium as described above, since a noble metal such as Co-Cr-Pt is used as the magnetic material as the method relying on the improvement of the magnetic composition, it is not economically advantageous.

Further, in the case of high temperature film-forming method of forming a magnetic layer by means of sputtering in a state of elevating the temperature of the substrate, although a magnetic recording medium improved with the coercive force can be obtained in the experimental level, if it is intended for mass production, the magnetic layer is not formed easily in a state where the temperature of heating the substrates exceeds 250° C. due to the problem in view of the film forming device such as the carrier for holding the substrate is liable to be deformed by heating. In addition, in the case of using the NiP plated substrate, there has been a problem that on amorphous NiP plated layer is crystallized and magnetized to give an undersired effect on the magnetic layer at higher than 280° C. and, further, deformation is caused to the substrate if it is heated to higher than 300° C.

On the other hand, the method of forming the magnetic layer in a state where a reversed bias voltage is applied to the substrate provides an excellent effect for the improvement of the coercive force but it involves a problem that the structure of the film forming device is complicated due to the requirement for applying the reverse bias voltage. In this way, even the sputtering thin film type medium is still insufficient for the increase of the recording density.

By the way, as the performance required for the substrate in view of attaining the increase of the recording density, there can be mentioned, for example, that it has a surface property with less surface roughness and no surface defects, it is chemically stable as a underlying base for the magnetic recording layer and it has such a hardness and strength as capable of ensuring durability against contact with a head. Further, as the performance required for the material of the substrate, there can be mentioned non-magnetic property, high hardness, high heat resistance, reduced weight, high strength and high rigidity.

For satisfying such requirements, magnetic recording medium using, as a substrate, a vitreous carbon substrate has recently been proposed. For instance, Japanese Patent Laid-Open Sho 62-234232 discloses a magnetic disc in which a magnetic thin film is formed on a vitreous carbon substrate and, further, the present inventors have also developed and have already filed an application (Japanese Patent Application Hei 1-188225) for a magnetic thin recording medium in which a thin Co-based alloy film is formed on a vitreous carbon substrate. Although these magnetic recording media can be evaluated as having high magnetic recording reliability, they can not yet been said to be satisfactory in view of making the coercive force higher for the improvement of the recording density.

DISCLOSURE OF THE INVENTION

The present invention has been made taking notice of the foregoing situations and it intends to provide a method of manufacturing a magnetic recording medium which enables to make the higher recording density by improving the coercive force and/or squareness ratio.

BRIEF DESCRIPTION OF THE DRAWINGS

FIGS. 7(a), 7(b), 7(c) and 7(d) are views illustrating magnetic properties under each of heat treating conditions for a magnetic disc obtained by Example 6, FIGS. 9(a), 9(b), 9(c) and 9(d) are views illustrating magnetic properties under each of heat treating conditions for a magnetic disc obtained by Example 8, FIGS. 11(a), 11(b), 11(c) and 11(d) are views illustrating magnetic properties under each of heat treating conditions for a magnetic disc obtained by Example 10.

Figure 1A:
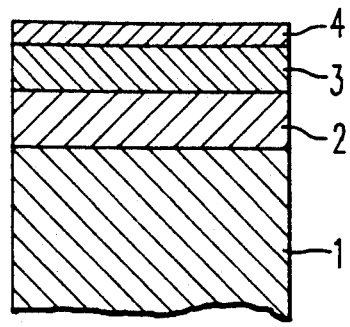
FIGS. 1(a) and 1(b) are explanatory cross sectional views for the constitution of a magnetic disc according to the present invention.

| 1 ... carbon substrate | 2 ... Cr underlayer |
|---|---|
| 3 ... CoNiCr magnetic layer | 4 ... C protecting and lubricating layer |

BEST MODE FOR PRACTICING THE INVENTION

The present inventors have made earnest studies for making the higher coercive force of a magnetic recording medium and, as a result, have accomplished the present invention based on the finding that the coercive force is improved by forming a Co-based alloy magnetic layer or the like on a carbon substrate by means of sputtering and then heating the same at a high temperature.

When the features of the carbon substrate are set forth, there can be mentioned, for example, that it is non-magnetic and is not hardly deformed even if it is heated to higher than 250° C., (2) it shows high Vickers hardness of about: Hv=about 650 as compared with the Vickers hardness of an aluminum alloy of: Hv=about 60 or the hardness of the NiP plated layer of: Hv=about 450 and a magnetic layer can be formed directly without applying the NiP plating layer, (3) since it is less reactive with other elements even at a high temperature and does not form solid intermetallic compounds and the like, no crystallizates are present in the material to enable to reduce bit errors caused by surface protrusions or bits and (4) since the bending strength is as large as 180 (MPa) and a specific gravity is as low as 1.5~2.0, weight reduction is possible as compared with the aluminum alloy substrate and NiP plated substrate and it has a merit as a substrate for the magnetic recording medium.

By applying a heat treatment at a temperature of 250° to 1450° C. to the carbon substrate as described above on which a magnetic layer and a protecting and lubricating layer are formed successively or a carbon substrate on which Cr layer, magnetic layer and protecting and lubricating layer are formed successively, coercive force can be improved with neither magnetization nor deformation of the substrate.

Although the function or the mechanism per se for attaining the improvement in the coercive force by the heat treatment as described above is not always apparent, it may be supposed as below.

In a case of forming a magnetic layer comprising a Co-based alloy such as Co-Ni-Cr, Co-Ni, Co-Ni-Pt, Co-Cr or Co-Cr-Ta on a carbon substrate, further forming a protecting and lubricating layer and then heating them in an atmospheric air at high temperature, it is considered that the grain boundary of the Co-based alloy magnetic layer is selectively oxidized and, further, segregation of Cr into the grain boundary is promoted in the Co-based alloy magnetic layer containing Cr and as a result, the coercive force is improved by the behavior of the crystal grains per se of the Co-bases alloy magnetic layer as single magnetic domain grains. Further, in a case where heating is applied at high temperature in vacuum or an inert gas atmosphere, it is considered that the coercive force is improved by the promotion of Cr segregation into the grain boundary described above in the Co-based alloy magnetic layer.

On the other hand, in the method of manufacturing a magnetic recording medium by forming a Cr underlayer on a carbon substrate, forming a Co-based alloy magnetic layer and then applying heat treatment, it is considered that the (110) face of the crystal lattice in the Cr underlayer is grown by the heat treatment in addition to the improving effect for the coercive force as described above and, the easy magnetization axis (c-axis) of the magnetic Co-based alloy layer is liable to be oriented within the face to improve the coercive force.

In the present invention, the range for the temperature of the heat treatment is defined as 250° to 1450° C., because no sufficient effect for improving the coercive force can be attained at a temperature lower than 250° C., whereas the Co-based alloy magnetic layer itself may possibly be destroyed by heat if it exceeds 1450° C. Preferably, it is from 350° to 800° C.

In a case of forming a protecting and lubricating layer on a magnetic layer and then applying the heat treatment, however, the protecting and lubricating layer may sometime react with oxygen to be gasified by the heat treatment, to reduce the thickness thereof or to be eliminated. That is, carbon is generally used for the protecting and lubricating layer and, if heat treatment is applied after forming the protecting and lubricating layer comprising C (hereinafter referred to as a C protecting and lubricating layer), the C protecting and lubricating layer reacts with oxygen to be gasified as: $C+O_2 \rightarrow CO_2$, thereby reducing the thickness thereof or being eliminated. Further, even in a case of heating at a high temperature in vacuum or in an inert gas atmosphere not in the atmospheric air after forming the C protecting and lubricating layer, if the vacuum degree or the replacement with the inert gas is not sufficient, the thickness of the C protecting and lubricating layer tends to be reduced by the gasifying reaction. In view of the above, it has been concluded that the heat treatment is preferably applied prior to the formation of the protecting and lubricating layer on the magnetic layer. The present invention is not restricted by the ingredient of the protecting and lubricating layer and $SiO_2$, $ZrO_2$ and the like may also be used in addition to carbon described above.

Further, the present inventors have found that if the heat treatment is conducted under the application of a magnetic field, the squareness ratio can be improved to attain the increased recording density.

That is, by conducting the heat treatment under the application of a magnetic field in the circumferential direction of a disc, directions of the magnetic moments in the magnetic domains of the Co-based alloy magnetic layer as the recording layer are aligned in the circumferential direction of the disc. This can increase the squareness ratio to improve the read out characteristics. It is only necessary that the level of the magnetic field applied is greater than the coercive force to be provided and the effect is greater as the difference becomes larger.

The present invention will now be explained referring to examples.

EXAMPLE 1

Description will at first be made to the manufacturing of a carbon substrate for a magnetic disc. After molding a phenol-formaldehyde resin into a magnetic disc-like shape, it was preliminarily baked in a $N_2$ gas atmosphere at a temperature of 1000° to 1500° C. Subsequently, it was applied with HIP treatment by using a hot isostatic pressing (HIP) device by applying an isotropic pressure of about 2000 atm while heating to 2500° C. The phenol-formaldehyde was baked and carbonized into a vitreous carbon molding product by the HIP treatment. The molding product was applied with a predetermined fabrication to the circumferential face and surface grinding to obtain a carbon substrate of 1.27 mm thickness×3.5 inch.

Then, after manufacturing a structure comprising the carbon substrate 1 on which respective layers of the Cr underlayer 2, the CoNiCr magnetic layer 3 and the C protecting and lubricating layer 4 were successively formed continuously by means of sputtering as shown by the constitution in FIG. 1(a) and the structure having no Cr underlayer 2 as shown by the constitution shown in FIG. 1(b) depending on the conditions for manufacturing the magnetic disc shown below, they were applied with a heat treatment under the conditions of 250°~450° C.×2 hr in an atmospheric air to manufacture magnetic discs.

| Conditions for Manufacturing Magentic Disc | |
|---|---|
| Film-forming system: | D.C. magnetron sputtering system |
| Substrate temperature: | 250° C. |
| Structure: | Carbon substrate |
| | Cr layer (thickness: 0, 500 Å, 1000 Å, 2000 Å, 3000 Å) |
| | $Co_{62.5}Ni_{30}Cr_{7.5}$ layer (thickness: 600 Å) |
| | C layer (thickness: 300 Å) |

| -continued | |
|---|---|
| Conditions for Manufacturing Magentic Disc | |
| Heat treating condition: | 250~450° C. × 2 hr |

Figure 2:
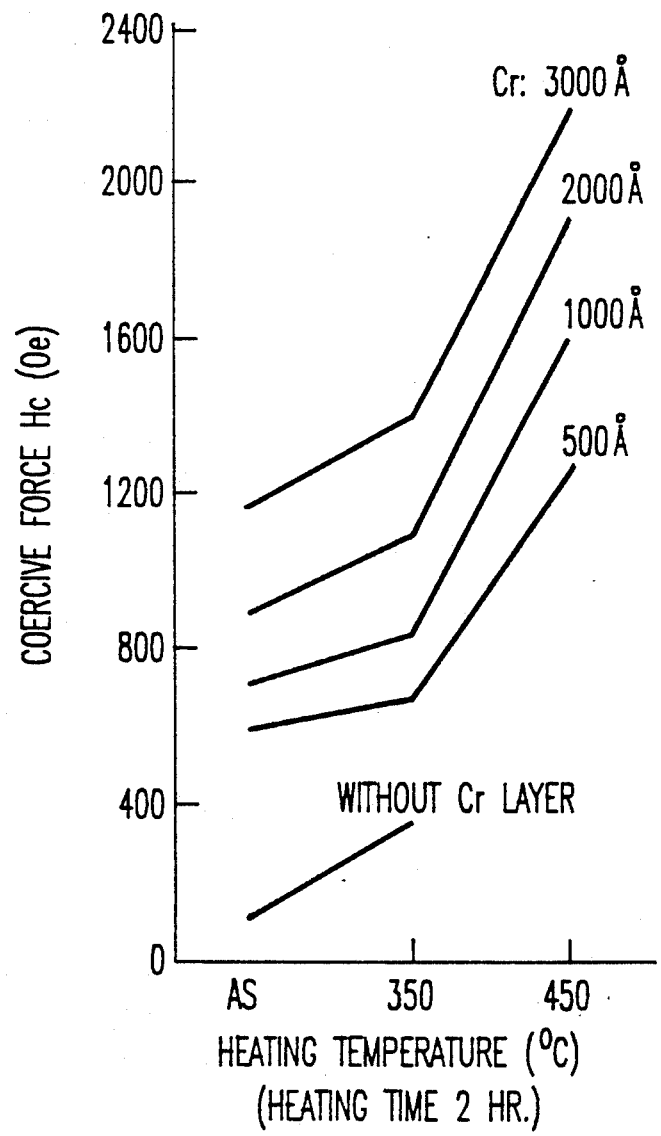
FIG. 2 is a view illustrating a relationship between the conditions for the heat treatment and the coercive force of a magnetic disc obtained by Example 1.

The coercive force Hc of the thus formed magnetic discs were measured by a vibrating sample type magnetometer (VSM). The results are shown in FIG. 2. In FIG. 2, reference numeral AS means "with no heat treatment".

Figure 3:
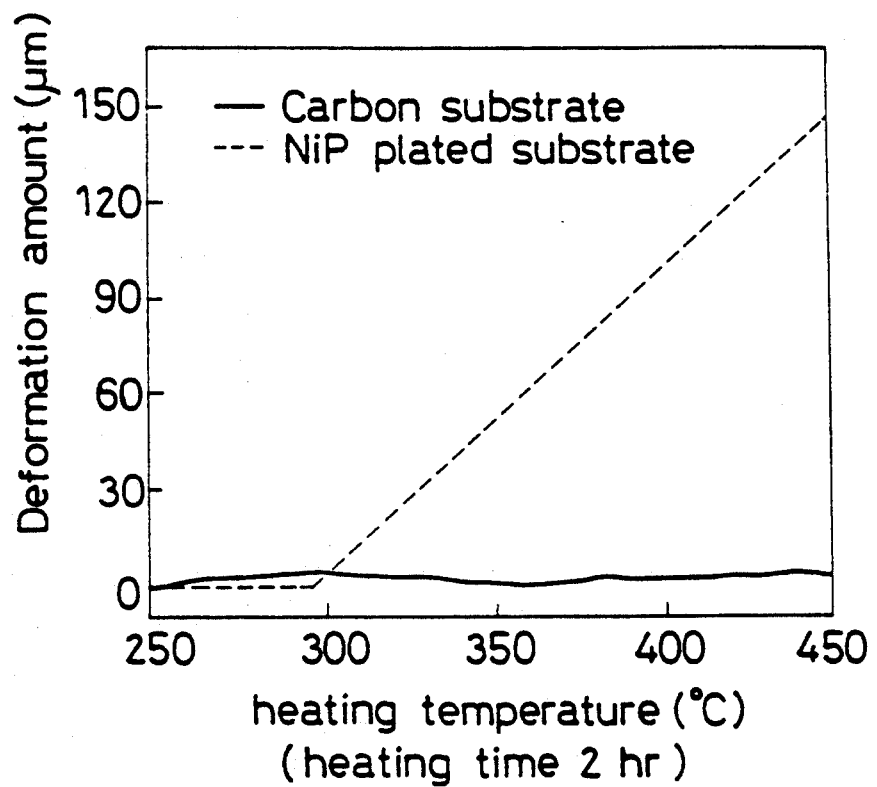
FIG. 3 is a view illustrating a relationship between the heating temperature and the deformation amount of the substrate in a carbon substrate according to the present invention and a conventional NiP plated substrate.

Further, the relationship between the conditions for the heat treatment and the amount of the magnetization was measured by VSM while using, for the comparison, a NiP plated substrate (prepared by applying NiP plating of about 15 μm thickness on Al-Mg alloy substrate and then applying surface polishing) having the same size as that for the carbon substrate for 3.5 inch. The results are shown in Table 1. Further, the relationship between the heating temperature and the deformation amount of the substrate was measured by a interferometer (trade name: NIDEK, manufactured by NIDEK Co.). The results are shown in FIG. 3.

TABLE 1

| Kind of substrate | | 250° C. × 2 Hr | | 300° C. × 2 Hr | | 350° C. × 2 Hr | |
|---|---|---|---|---|---|---|---|
| | | Br | Bs | Br | Bs | Br | Bs |
| Carbon substrate | 1 | Non-magnetic property | | | | | |
| | 2 | | | | | | |
| | 3 | | | | | | |
| NiP plated substrate | 1 | 0.3 | 1.8 | 20.4 | 162.0 | 239.6 | 570.9 |
| | 2 | 0.3 | 1.3 | 37.0 | 173.8 | 221.6 | 523.8 |
| | 3 | 0.3 | 0.8 | 33.6 | 163.0 | 213.8 | 538.1 |

Remarks
(1) Br: residual magentic flux density (G) Bs: saturation magentic flux density (G)
(2) Bs < 10 (G) is required in the case of NiP plated substrate As can be seen from FIG. 2, the coercive force could be improved in any of magnetic discs, a partial cross section of which is shown in FIG. 1(a) and (b) by applying heat treatment in an atmospheric air. Further, as shown in Table 1 and FIG. 3, the conventional NiP plated substrate is magnetized already at about 250° C. and causes deformation in excess of 310° C., whereas the carbon substrate is neither magnetized nor deformed if it is heated to higher than 250° C. In a case of applying the heat treatment in an atmospheric air as in this example, since the saturation magnetic flux density (Bs) and the residual magnetic flux density (Br) as other magnetic properties tend to be reduced along with the progress of oxidization in the Co-based alloy magnetic layer (CoNiCr magnetic layer 3 in this case), it is desirable to apply a heat treatment at a high temperature and a short time when it is intended to obtain the coercive force Hc to the same extent.

EXAMPLE 2

Figure 4:
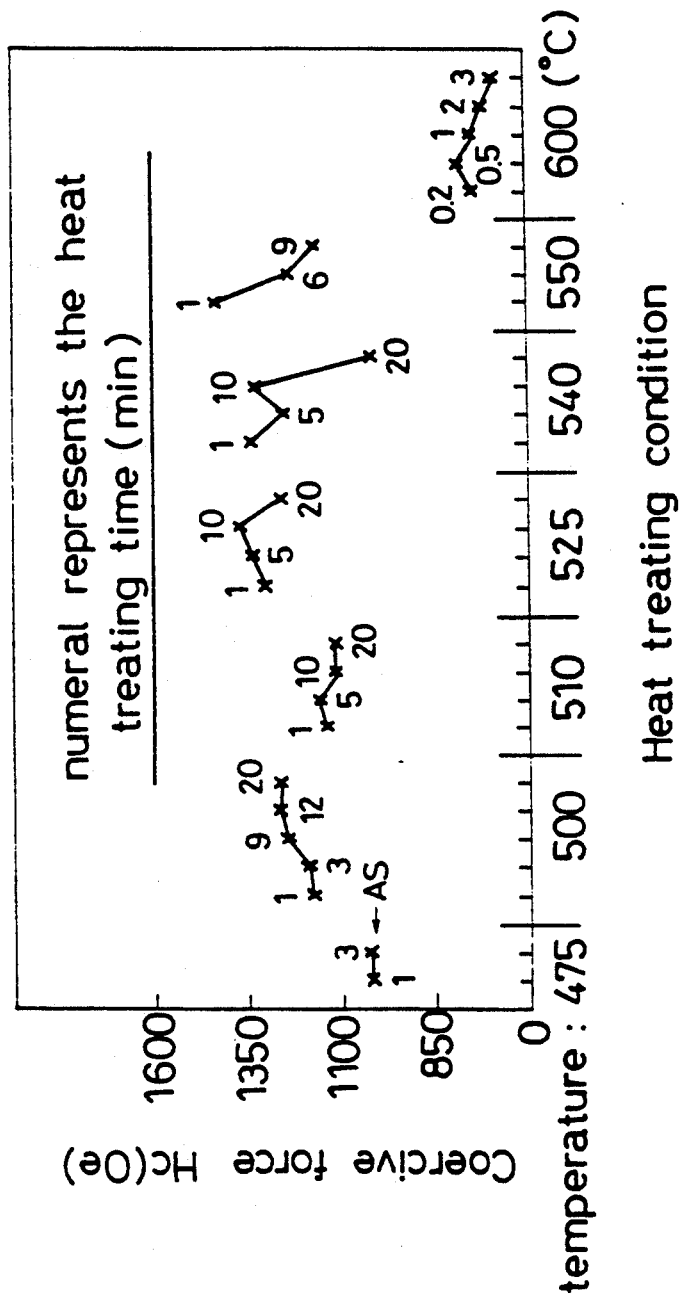
FIGS. 4(a), 4(b), 4(c) and 4(d) are views illustrating magnetic properties under each of heat treating conditions for a magnetic disc obtained by Example 2.

A magnetic disc in which a Cr underlayer of 3000 Å thickness was formed on the carbon substrate was manufactured in the same way as in Example 1 except for applying the heat treatment in vacuum. The degree of vacuum in the heat treatment was 30 mTorr, and the heating temperature and the heating time are shown in FIG. 4(a).

Figure 4C:
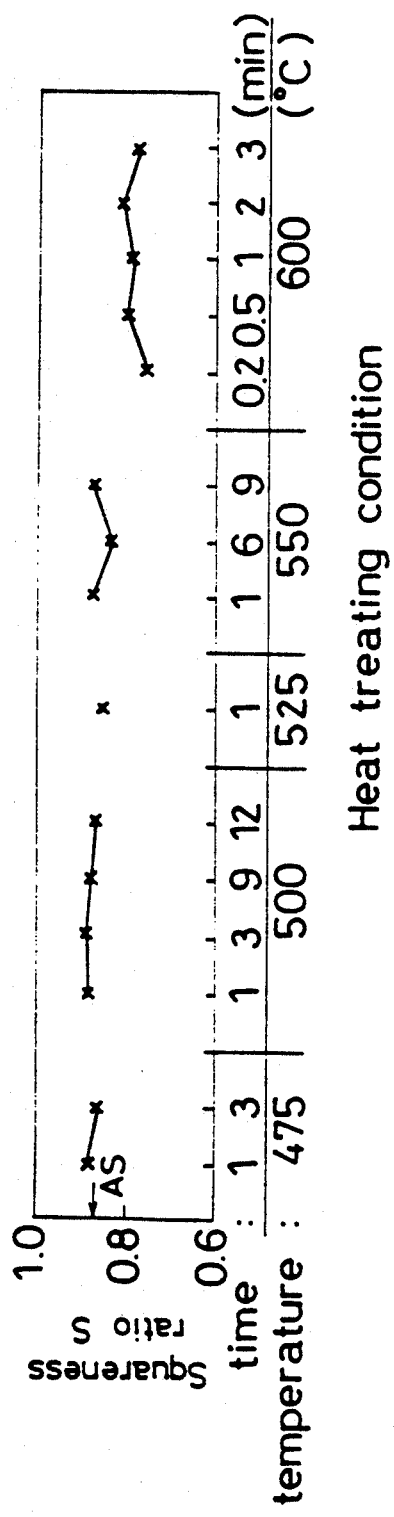
Figure 4D:
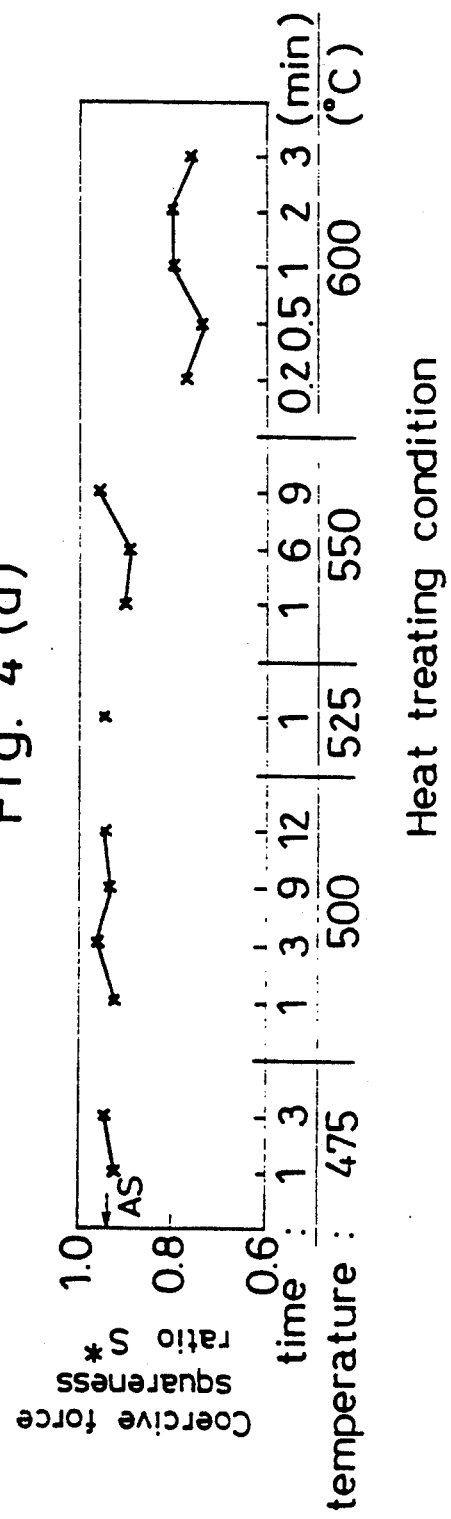
Figure 4:
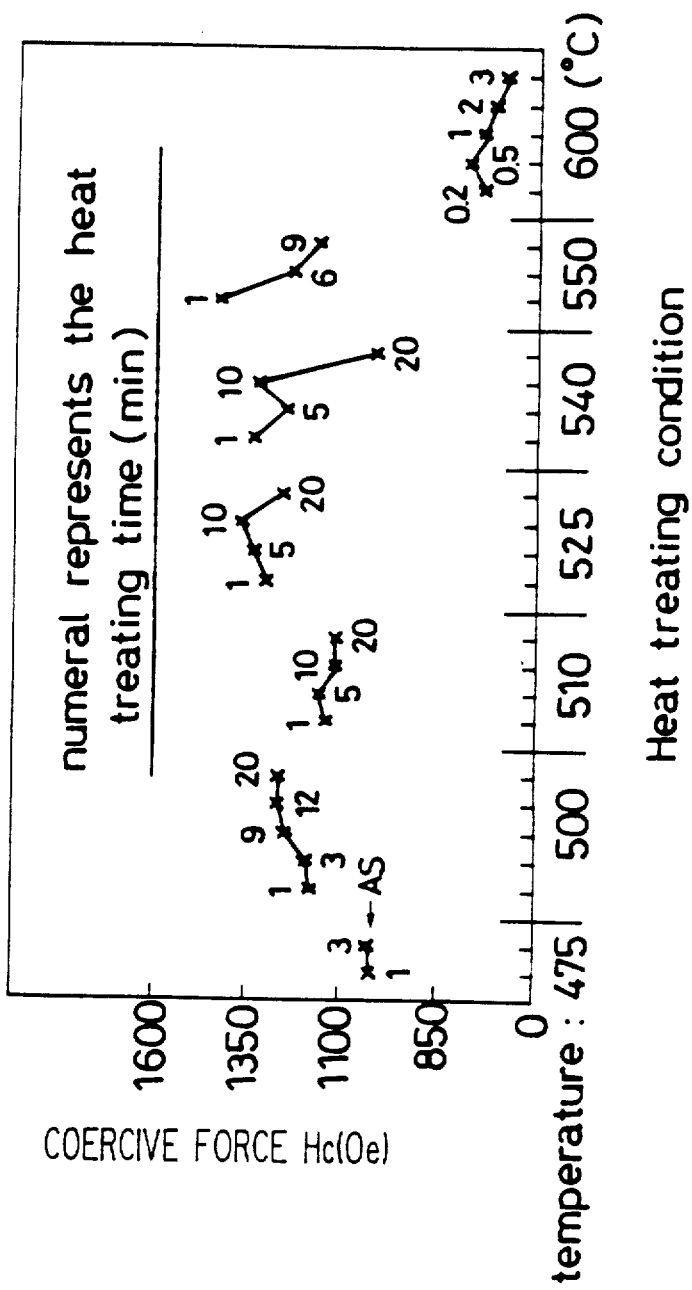
Figure 4B:
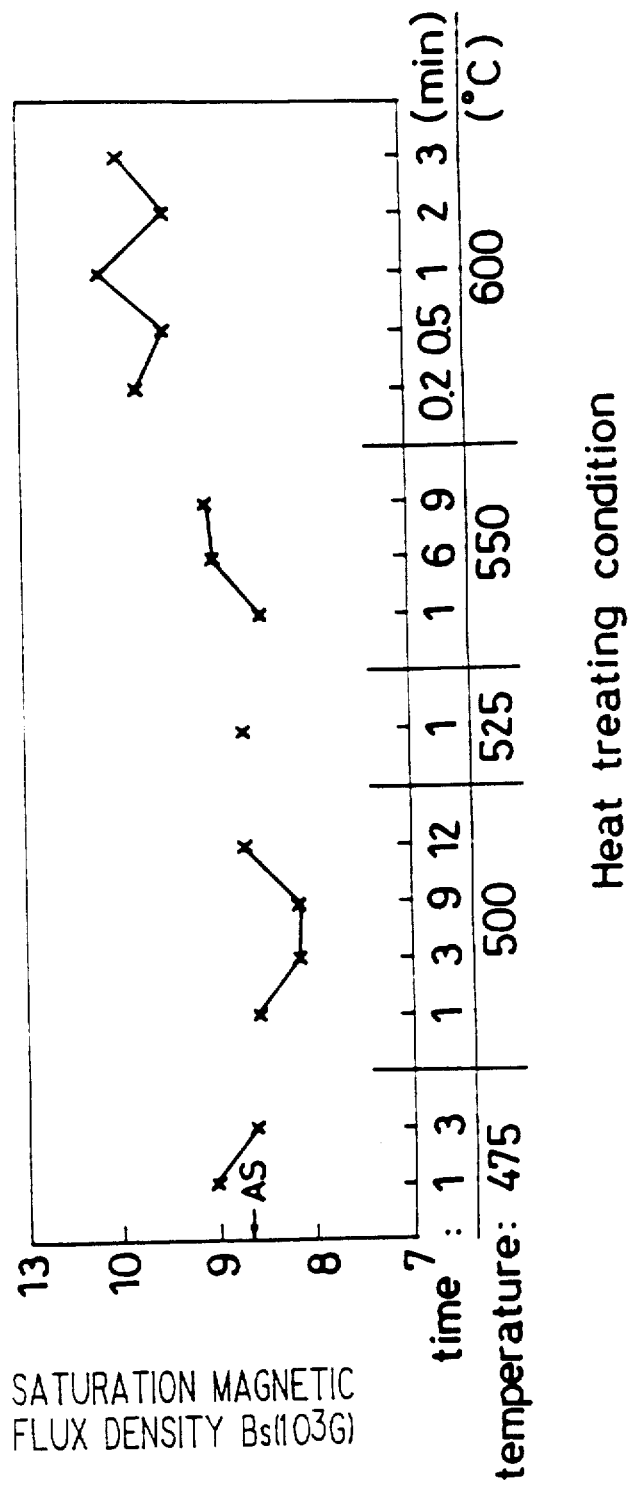
Figure 4C:
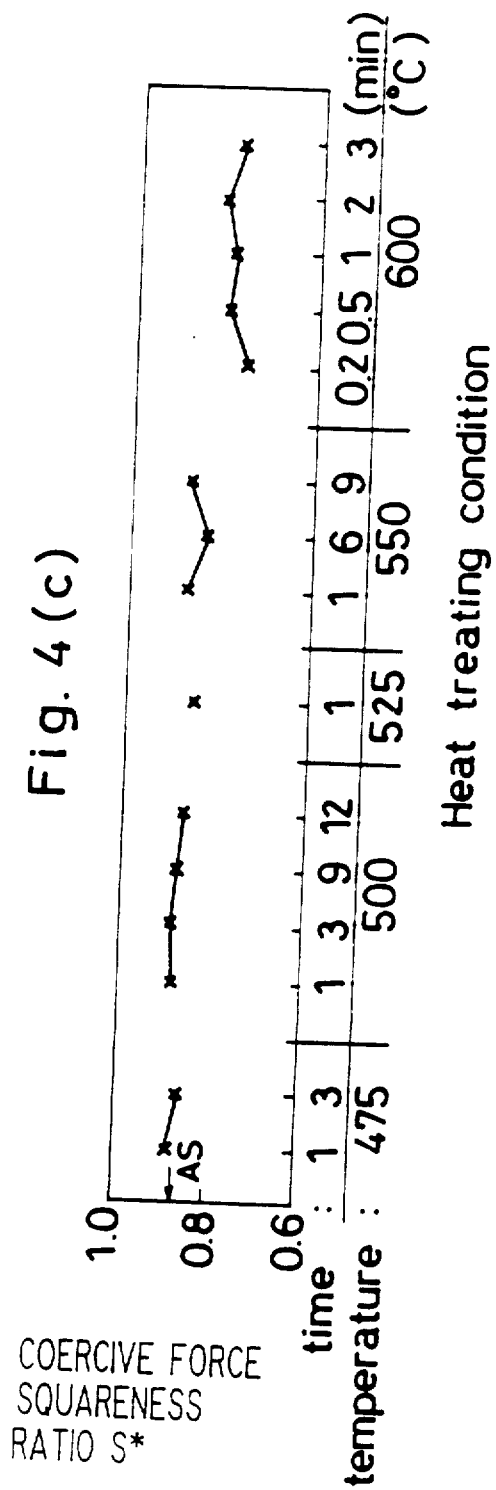
Figure 4D:
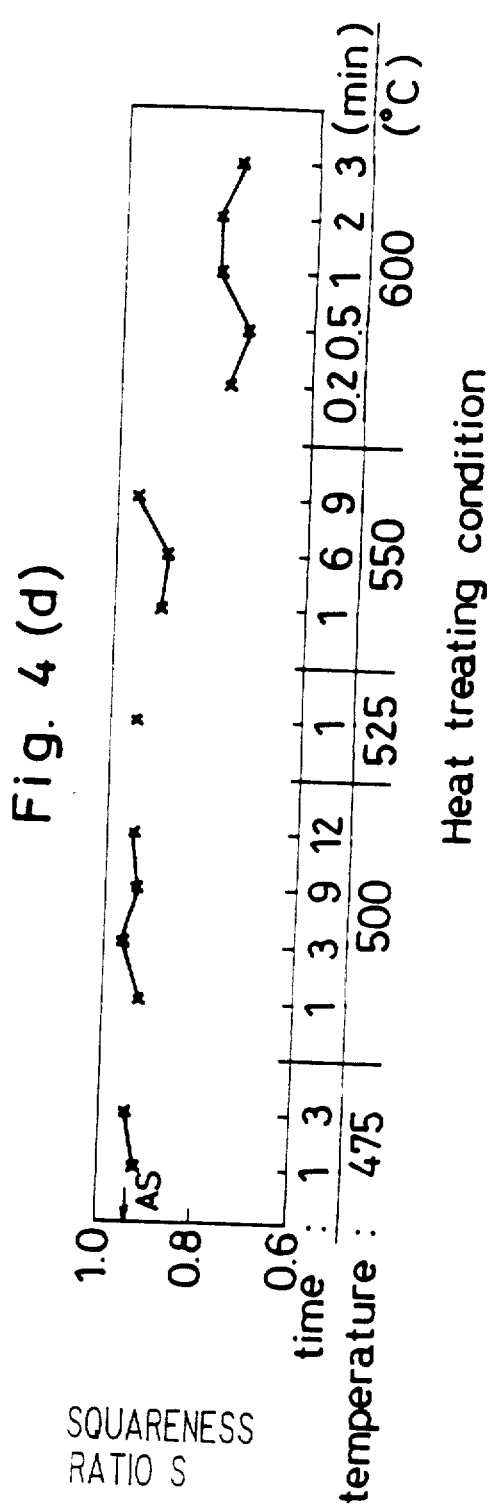

Then, the coercive force Hc, the saturation magnetic flux density Bs, the squareness ratio S (=Br/Bs) and the coercive squareness ratio S* (corresponding to m in the formula (1)) of the resultant magnetic discs were measured respectively by VSM. The results are shown in FIG. 4(a) to FIG. 4(d). FIG. 4(a) is a view illustrating a relationship between the conditions for the heat treatment and the coercive force Hc, FIG. 4(b) is a view illustrating a relationship between the conditions for the heat treatment and the saturation magnetic flux density Bs, FIG. 4(c) is a view illustrating the relationship between the condition for the heat treatment and the squareness ratio S and FIG. 4(d) is a view illustrating the relationship between the condition for the heat treatment and the coercive squareness ratio S*. In each of the figures, the reference AS shows the measured value in the case of not applying the heat treatment.

As can be seen from FIG. 4(a), a magnetic disc with improved coercive force Hc could be obtained in a range for the heating temperature from 500° to 550° C. even by applying the heat treatment in vacuum. In this case, as can be seen from FIG. 4(b) to FIG. 4(d), since excess oxidizing phenomenon of the CoNiCr magnetic layer 3 which is considered to be liable to occur by the heat treatment in the atmospheric air can be avoided, the residual magnetic flux density Br and the coercive squareness ratio S* as other magnetic properties required for attaining the increased recording density maintain the values substantially equal with those in a case of not applying the heat treatment, and the coercive force Hc could be improved without reducing them.

EXAMPLE 3

Magnetic discs were manufactured in the same way as in Example 2 except for not forming the Cr underlying layer 2. The heating temperature and heating time are shown in FIG. 5(a).

Figure 5B:
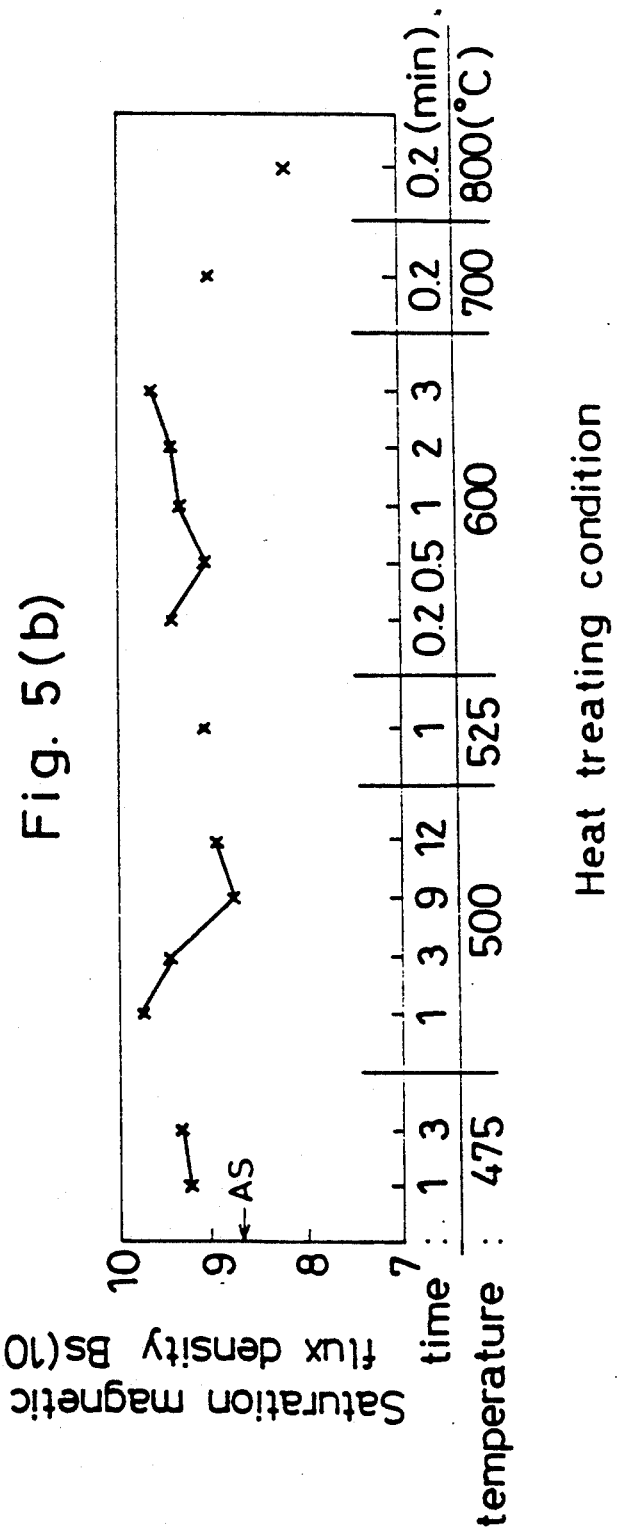
FIG. 5(a) and FIG. 5(b) are views illustrating magnetic properties under each of heat treating conditions for a magnetic disc obtained by Example 3.

Then, in the same way as in Example 2, the coercive force Hc and the saturation magnetic flux density Bs were measured. FIG. 5(a) shows the relationship between the conditions for the heat treatment and the coercive force Hc and FIG. 5(b) shows the relationship between conditions for the heat treatment and the saturation magnetic flux density Bs. In each of the figures, the reference AS shows the measured value in the case of not applying the heat treatment.

Figure 5A:
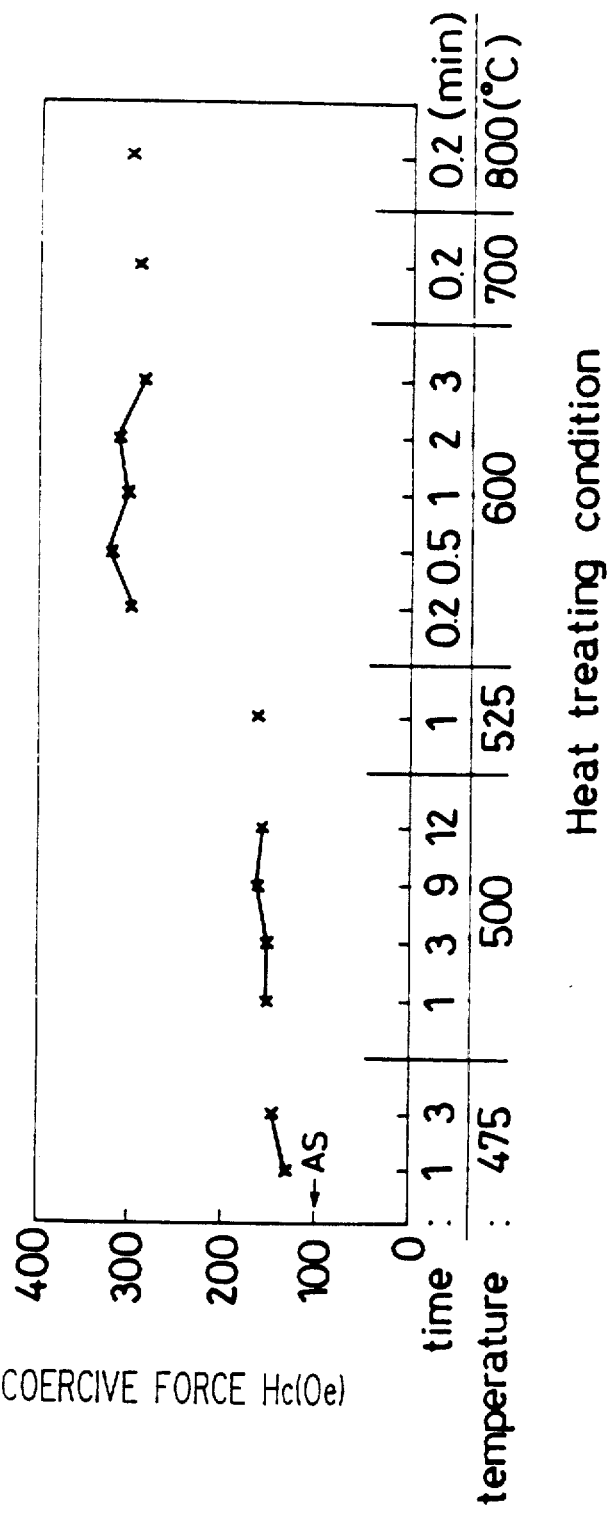
Figure 6A:
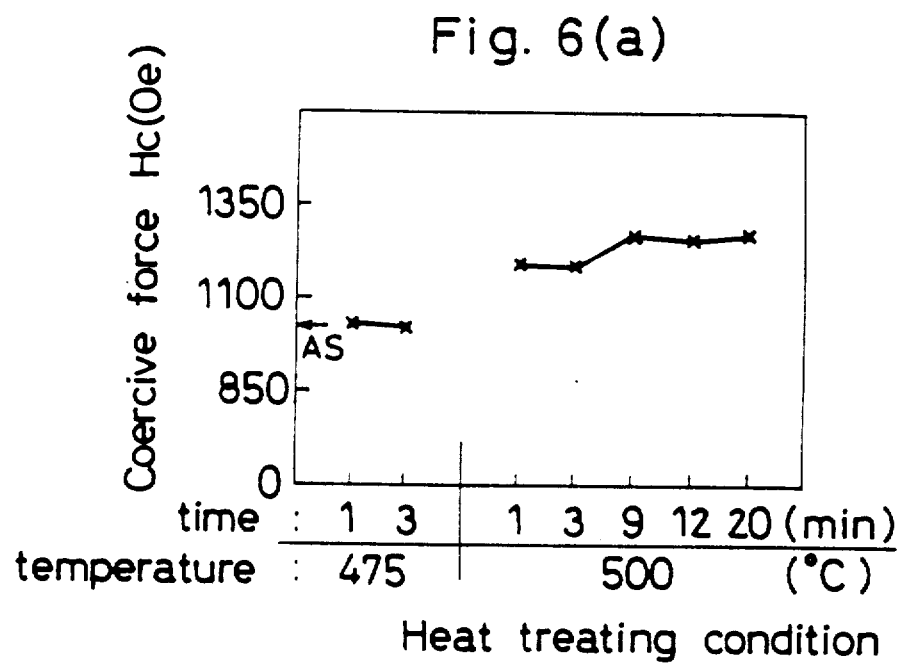
Figure 6B:
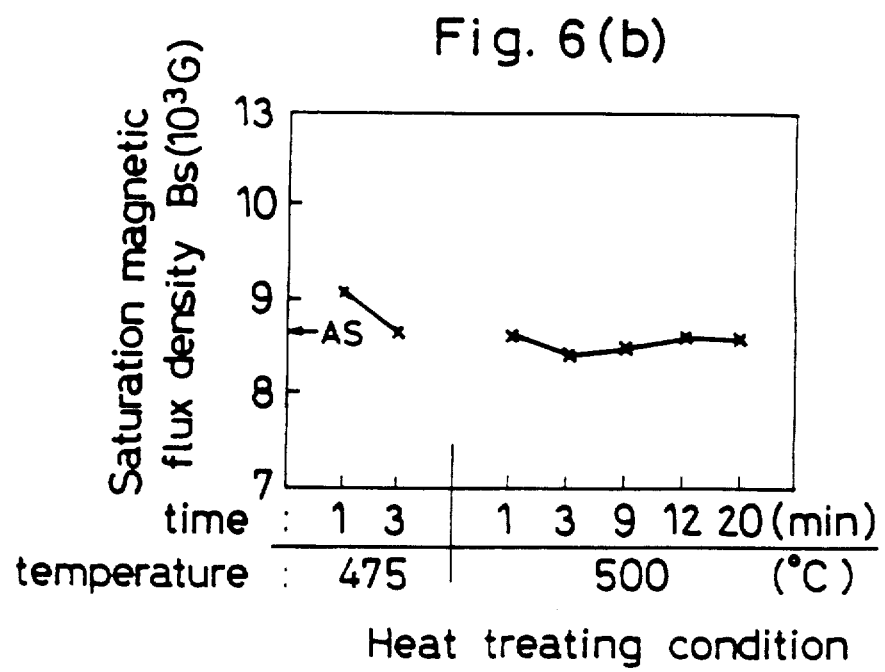
Figure 6C:
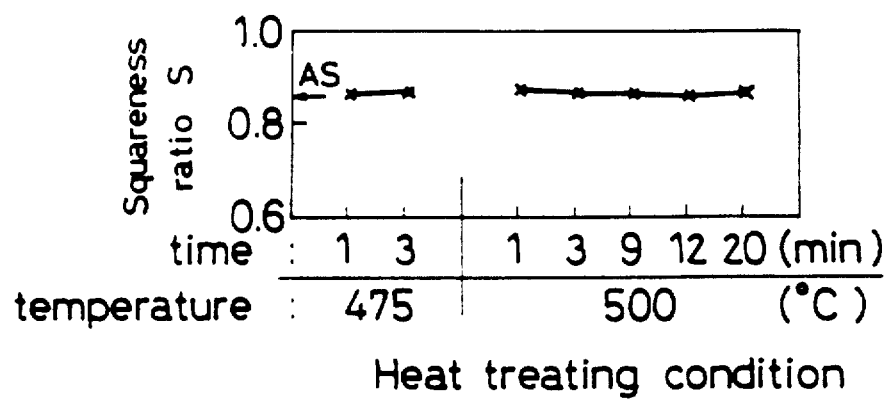
Figure 6D:
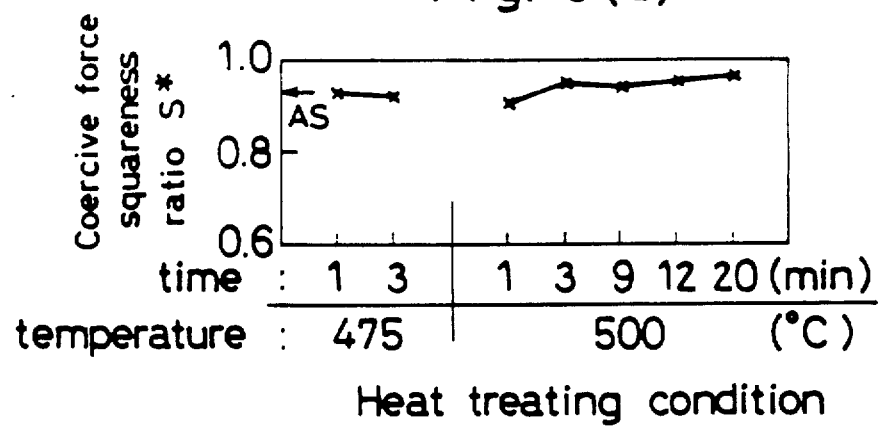

As can be seen from FIG. 5(a), a magnetic disc having the coercive force Hc increasing along with the elevation of the heating temperature could be obtained by applying the heat treatment in vacuum for the material not having the Cr underlayer 2 on the carbon substrate 1.

EXAMPLE 4

Figure 6A:
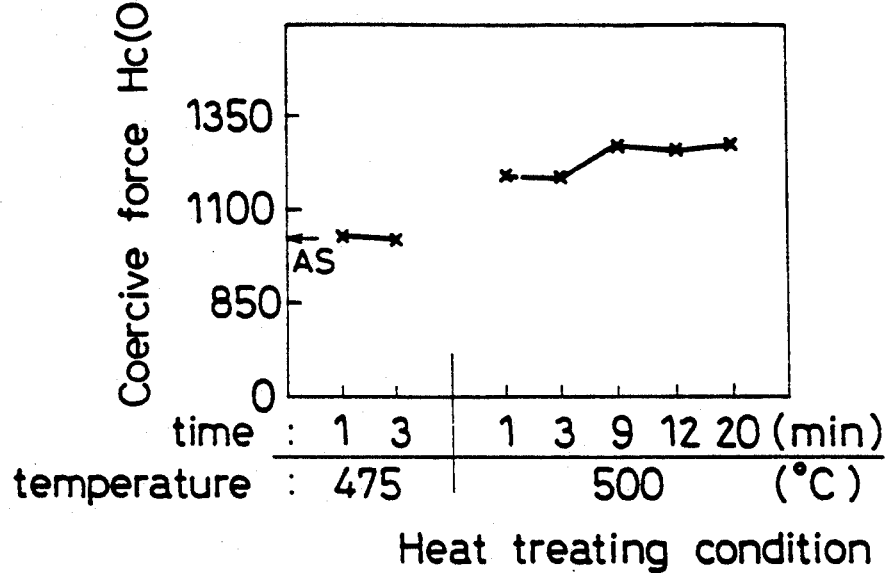
FIGS. 6(a), 6(b), 6(c) and 6(d) are views illustrating magnetic properties under each of heat treating conditions for a magnetic disc obtained by Example 4.

Magnetic discs were manufactured in the same way as in Example 2 except for applying the heat treatment in an inert gas atmosphere. The heating temperature and the heating time are shown in FIG. 6(a).

Figure 6B:
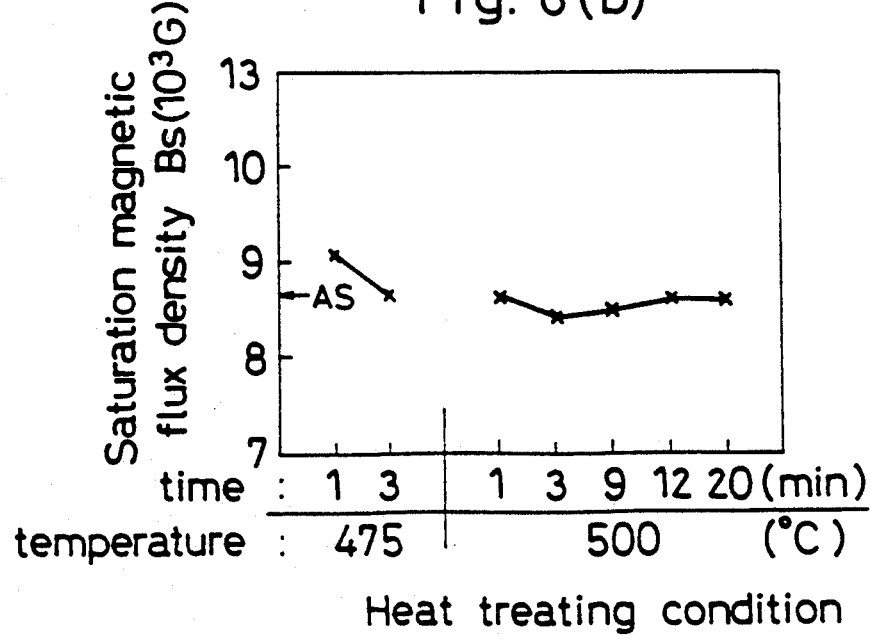
Figure 6C:
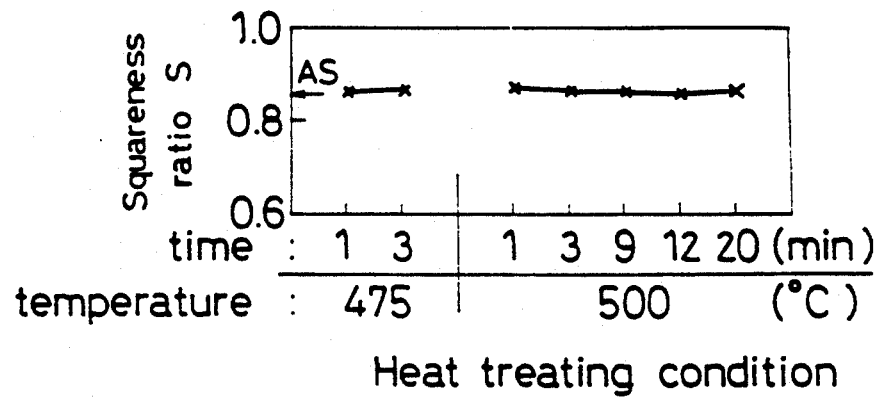
Figure 6D:
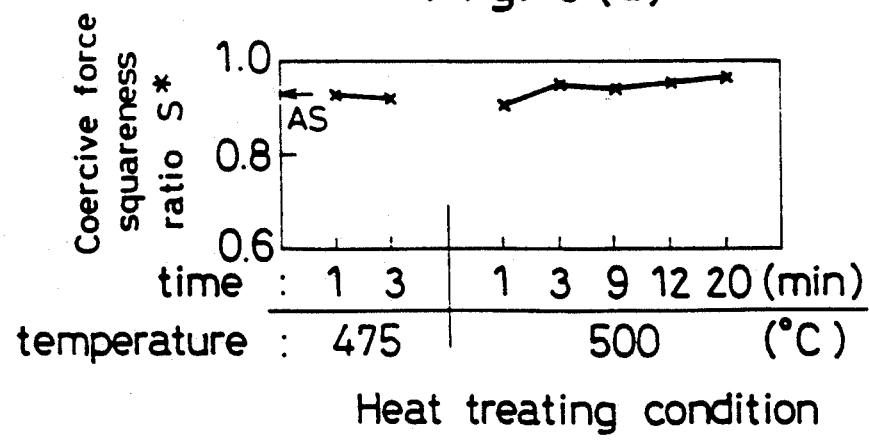

Then, the coercive force Hc, the saturation magnetic flux density Bs, the squareness ratio S and the coercive squareness ratio S* of the resultant magnetic discs were measured respectively by VSM. The results are shown in FIG. 6(a) to FIG. 6(d). FIG. 6(a) is a view illustrating the relationship between the conditions for the heat treatment and the coercive force Hc, FIG. 6(b) is a view illustrating the relationship between the conditions for the heat treatment and the saturation magnetic flux density Bs, FIG. 6(c) is a view illustrating the relationship between the conditions for the heat treatment and the squareness ratio S and FIG. 6(d) is a view illustrating the relationship between the conditions for the heat treatment and the coercive squareness ratio S*. In each of the figures, the reference AS shows the measured value in the case without applying the heat treatment.

In this way, by applying the heat treatment in an Ar gas atmosphere, magnetic discs with improved coercive force Hc could be obtained without reducing the residual magnetic flux density Br and the coercive squareness ratio S*.

Further, although the heat treatment is applied in the Ar gas atmosphere in this example, it is confirmed that the coercive force Hc can be increased by applying the heat treatment in a $N_2$ gas atmosphere instead of the Ar gas atmosphere in the method according to the present invention.

Further, examples of magnetic discs prepared by forming the Cr underlayer and the Co-based alloy magnetic layer by means of sputtering in each of the examples described above, but the present invention is applicable also to magnetic discs using a carbon substrate on which the layers are formed by the method such as vapor deposition or plating.

EXAMPLE 5

Magnetic discs were manufactured in the same way as in Example 1 except for applying the heat treatment under each of the conditions of 450° C.×15 min and 500° C.×3 min in an atmospheric air after forming the Cr underlayer 2 of 3000 Å and the CoNiCr magnetic layer 3 and before forming the C protecting and lubricating layer 4 on the carbon substrate 1.

The coercive force Hc, the saturation magnetic flux density Bs, the squareness ratio S and the coercive squareness ratio S* for each of the resultant magnetic discs were measured by VSM respectively, and the thickness of the C protecting and lubricating layer 4 was measured by a surface roughness gage (trade name; Talystep, manufactured by Rank Taylor Hobson Co.). Further, after conducting a so-called circumstance test of leaving each of the thus manufactured magnetic discs in a high temperature and high humidity atmosphere at a temperature of 65° C. and a humidity of 85%, each of the above-mentioned values was measured again.

The results are shown in Table 2. For the comparison, the results of the test specimen in Example 1 in which the Cr underlayer of 3000 Å was formed are also shown in Table 2.

TABLE 2

| Section | Measuring item | Value without heat treatment | Heat treatment condition and each of measured value | | | |
|---|---|---|---|---|---|---|
| | | | 450° C. × 15 min | | 500° C. × 3 min | |
| | | | Before circumstance test | After circumstance test | Before circumstance test | After circumstance test |
| Example 5 | Hc (Oe) | 1005 | 1575 | 1575 | 1740 | 1740 |
| | S | 0.86 | 0.75 | 0.75 | 0.76 | 0.76 |
| | S* | 0.96 | 0.46 | 0.46 | 0.32 | 0.32 |
| | Bs (G) | 8850 | 4700 | 4700 | 3420 | 3420 |

TABLE 2-continued

| Section | Measuring item | Value without heat treatment | Heat treatment condition and each of measured value | | | |
|---|---|---|---|---|---|---|
| | | | 450° C. × 15 min | | 500° C. × 3 min | |
| | | | Before circumstance test | After circumstance test | Before circumstance test | After circumstance test |
| Example 1 | C-layer thickness (Å) | 300 | 300 | 300 | 300 | 300 |
| | Hc (Oe) | 1015 | 1550 | 1555 | 1715 | 1720 |
| | S | 0.86 | 0.74 | 0.73 | 0.75 | 0.73 |
| | S* | 0.95 | 0.43 | 0.43 | 0.32 | 0.30 |
| | Bs (G) | 8790 | 4705 | 3700 | 3405 | 2680 |
| | C-layer thickness (Å) | 300 | 0 | 0 | 0 | 0 |

As can be seen from Table 2, magnetic discs with increased coercive force Hc could be obtained by applying the heat treatment in both of the methods in Example 5 and Example 1. However, since the method of the Example 1 used the manufacturing step of applying the heat treatment, in an atmospheric air to the carbon substrate 1 on which the Cr underlayer 2, the CoNiCr magnetic layer 3 and the C protecting and lubricating layer 4 were successively formed, the C protecting and lubricating layer 4 was gasified and eliminated by the heating due to the high temperature oxidation in the heat treating conditions of Example 5. Accordingly, the CoNiCr magnetic layer 3 was deteriorated and the value of the saturation magnetic flux density Bs was reduced in the circumstance test.

On the contrary, in the method of Example 5, since the heat treatment is applied prior to the formation of the C protecting and lubricating layer 4 on the CoNiCr magnetic layer 3, magnetic discs having high coercive force Hc and causing no reduction in the saturation magnetic flux density Bs or the like due to the failure of the C protecting and lubricating layer 4 even after the circumstance test were obtained. In the case of applying the heat treatment in the atmospheric air as in this example, since the saturation magnetic flux density Bs and the residual magnetic flux density Br tend to be reduced along with the progress of the oxidation of the Co-based alloy magnetic layer (CoNiCr magnetic layer 3 in this case), it is desirable to apply the heat treatment at a high temperature and in a short time for attaining the identical coercive force Hc.

EXAMPLE 6

Magnetic discs were manufactured in the same way as in Example 5 except for applying the heat treatment in vacuum. The heating temperature and the heating time are shown in FIG. 7(a).

Figure 7C:
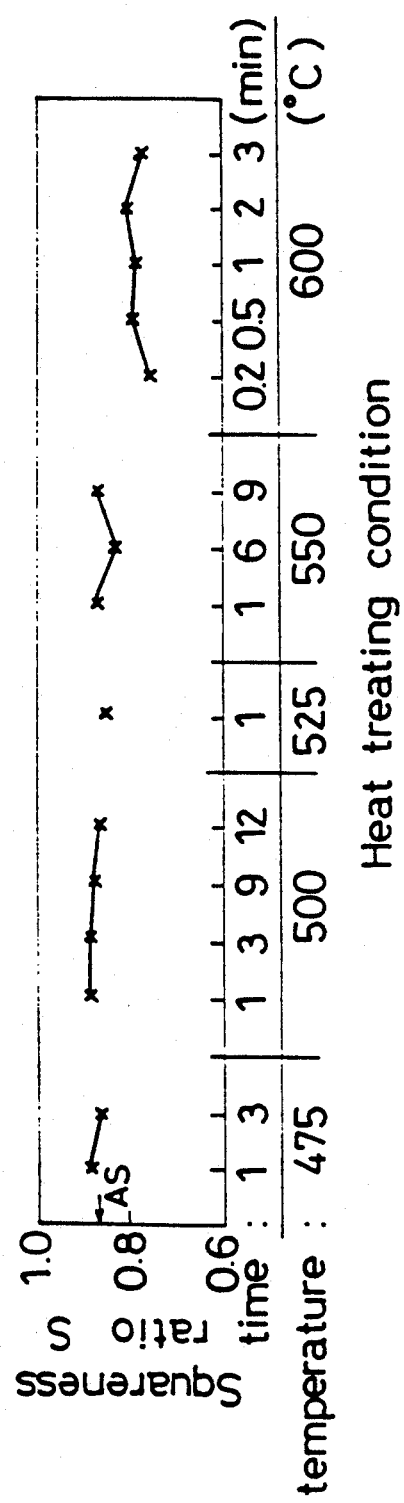
Figure 7D:
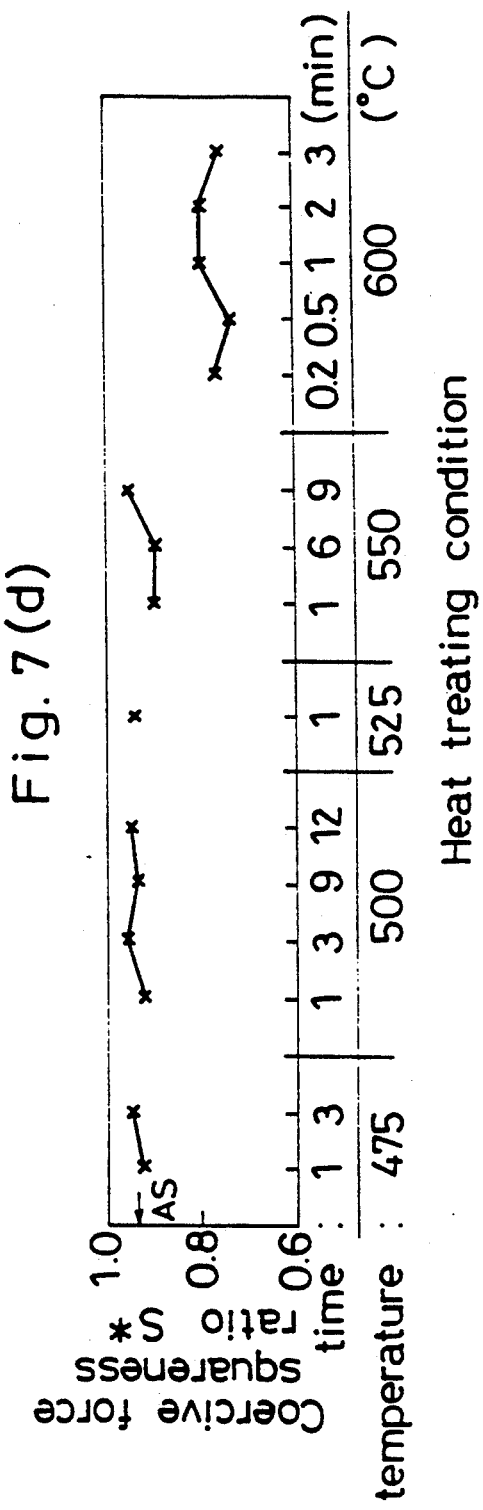

The coercive force Hc, the saturation magnetic flux density Bs, the squareness ratio S and the coercive force squareness ratio S* of the resultant magnetic discs were measured respectively by VSM. The results are shown in FIG. 7(a) to FIG. 7(d). FIG. 7(a) is a view illustrating the relationship between the conditions for the heat treatment and the coercive force Hc, FIG. 7(b) is a view illustrating the relationship between the conditions for the heat treatment and the saturation magnetic flux density Bs, FIG. 7(c) is a view illustrating the relationship between the conditions for the heat treatment and the squareness ratio S and FIG. 7(d) is a view illustrating the relationship between the condition for the heat treatment and the coercive squareness ratio S*. In each of the figures, the reference AS shows the measured value in the case not applying the heat treatment.

Figure 7A:
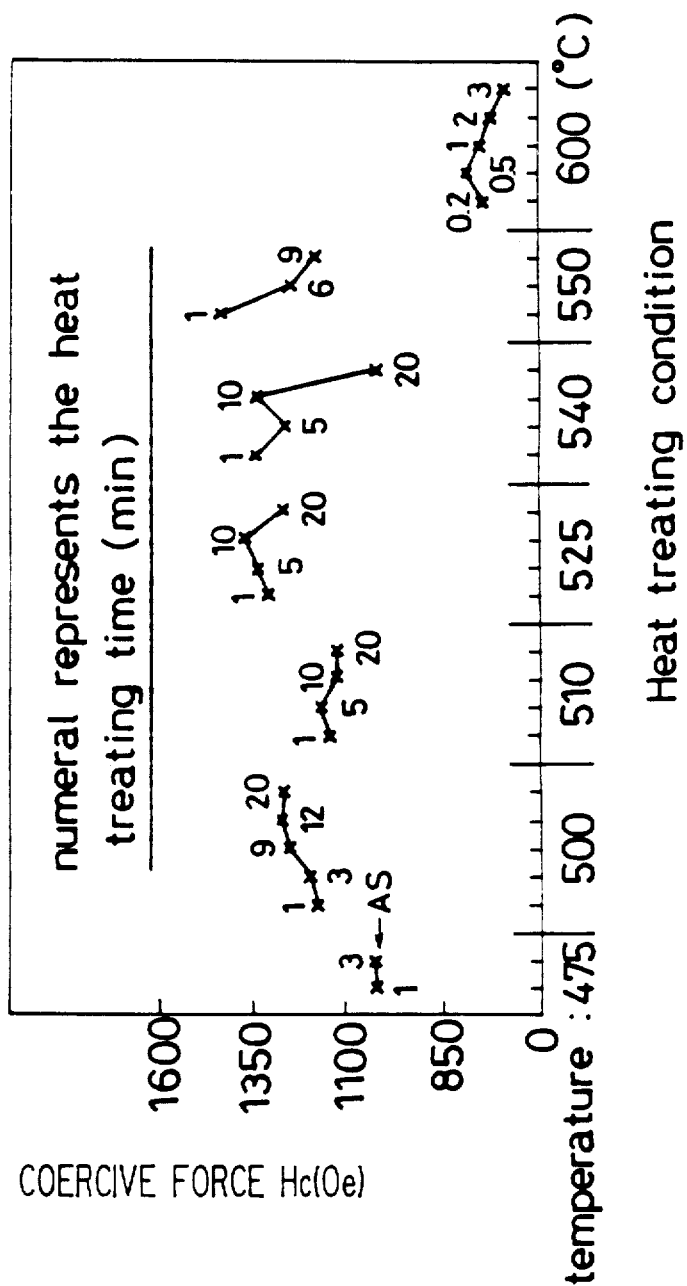

As can be seen from FIG. 7(a), magnetic discs with improved coercive force Hc could be obtained in a range for the heating temperature of 500° to 550° C. under the conditions in this example. In this case, as can be seen from FIG. 7(b) and FIG. 7(c), since excess oxidization phenomenon of the CoNiCr magnetic layer 3 which is considered to be liable to occur by the heat treatment in the atmospheric air can be avoided, the squareness ratio S and the saturation magnetic flux density Bs (residual magnetic flux density Br) as for factors for other magnetic properties required for attaining the increased recording density maintain the substantially equal with those in a case of not applying the heat treatment, and the coercive force Hc could be improved without reducing them. Further, since the heat treatment was applied prior to the formation of the C protecting and lubricating layer 4 on the CoNiCr magnetic layer 3, reduction in the thickness of the C protecting and lubricating layer 4 liable to occur upon heat treatment after forming the C protecting and lubricating layer 4 in a case of poor vacuum degree could be avoided.

EXAMPLE 7

Magnetic discs were manufactured in the same way as in Example 6 except for not forming the Cr underlayer. The heating temperature and the heating time are shown in FIG. 8(a).

The coercive force Hc and the saturation magnetic flux density Bs of the resultant magnetic discs were measured by VSM.

Figure 8B:
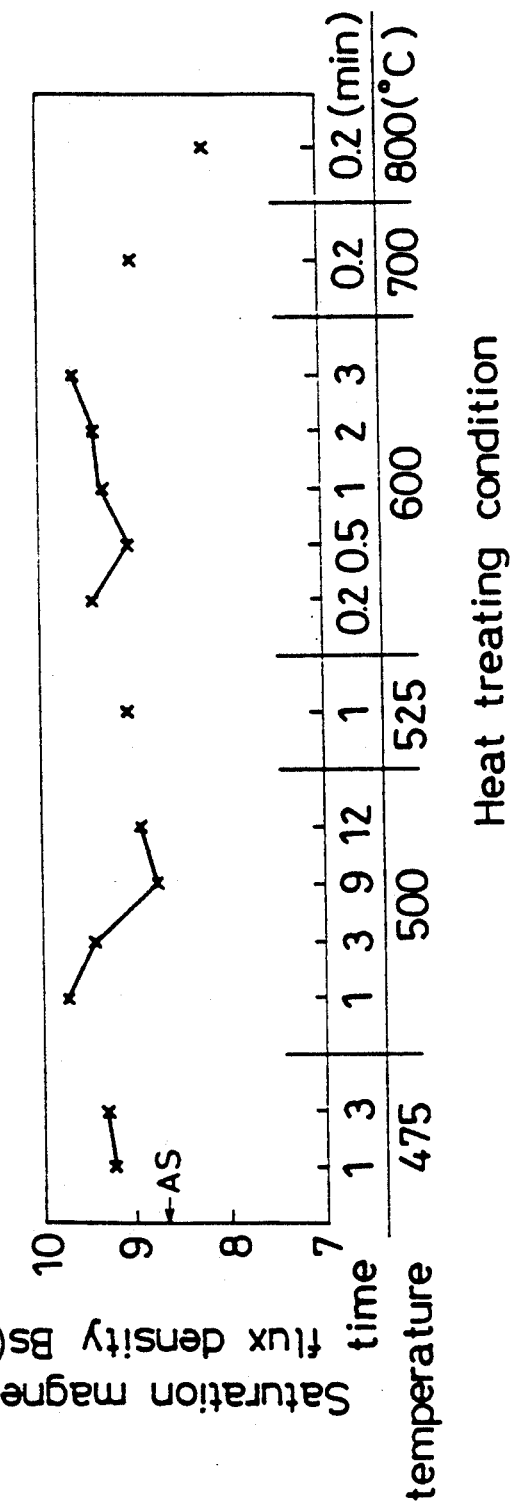
FIG. 8(a) and FIG. 8(b) are views illustrating magnetic properties under each of heat treating conditions for a magnetic disc obtained by Example 7.
Figure 8A:
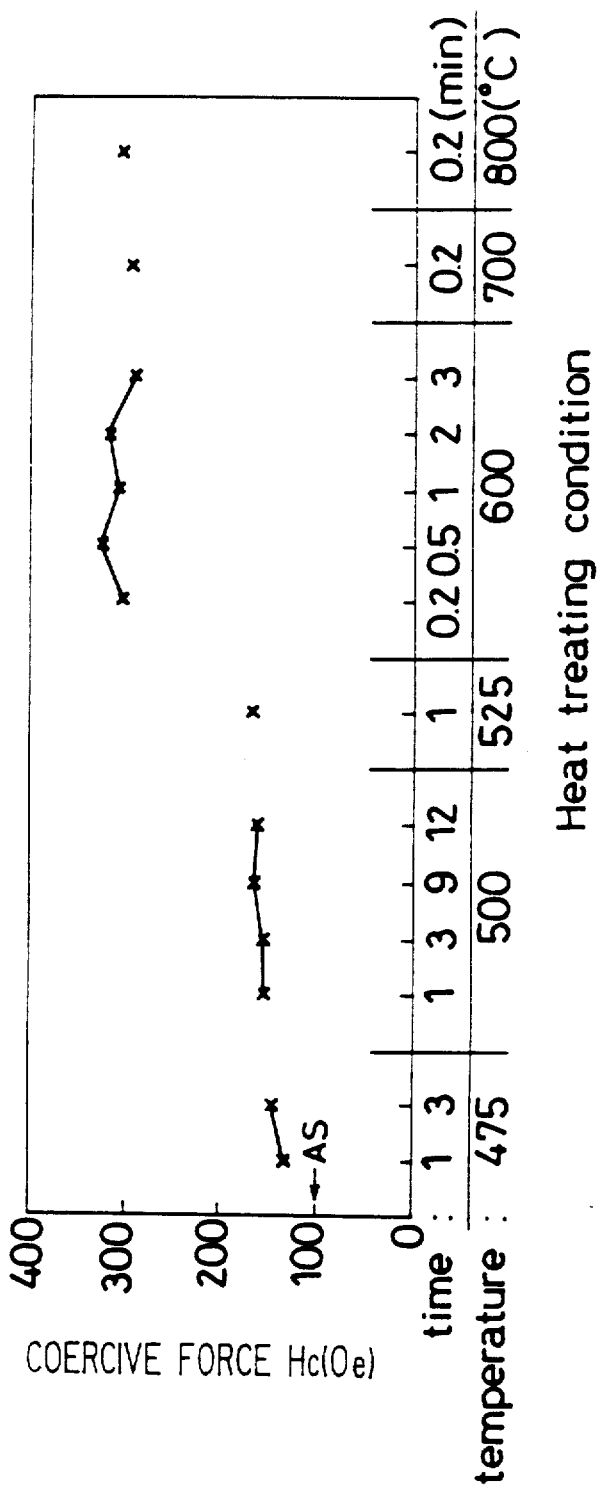

FIG. 8(a) shows a relationship between the conditions for the heat treatment and the coercive force Hc and FIG. 8(b) shows a relationship between the conditions for the heat treatment and the saturation magnetic flux density Bs. In each of the figures, the reference AS represents the measured value in the case not applying the heat treatment.

As can be seen from FIG. 8(a), magnetic discs having the coercive force Hc increased along with the elevation of the heating temperature could be obtained under the conditions in this example. Further, since the heat treatment was applied prior the the formation of the C protecting and lubricating layer 4 on the CoNiCr magnetic layer 3, it was possible to avoid the decrease of the thickness of the C protecting and lubricating layer 4 which is liable to occur upon heat treatment after the formation of the C protecting and lubricating layer 4 in a case where the vacuum degree is poor.

Although examples for manufacturing magnetic discs by forming the Cr underlayer and the Co-based alloy magnetic layer by means of sputtering in each of the examples above, but the present invention is also applicable to the case of forming such layers by the method of vapor deposition, plating, etc. and is also applicable to a case of applying the heat treatment in an inert gas atmosphere.

EXAMPLE 8

Magnetic discs were manufactured in the same way as in Example 2 except for applying the heat treatment under a magnetic field at a intensity of 5,000 Oe and directed to the circumferential direction of the disc by using a heat treatment device under the magnetic field. The heating temperature and the heating time are shown in FIG. 9(a).

A plurality of specimens each 8×8 mm were cut out from the resultant magnetic discs, and in property along the circumferential direction of the disc were measured for the coercive force Hc, the saturation magnetic flux density Bs, the squareness ration S and the coercive squareness ratio Sr, respectively by VSM.

Figure 9B:
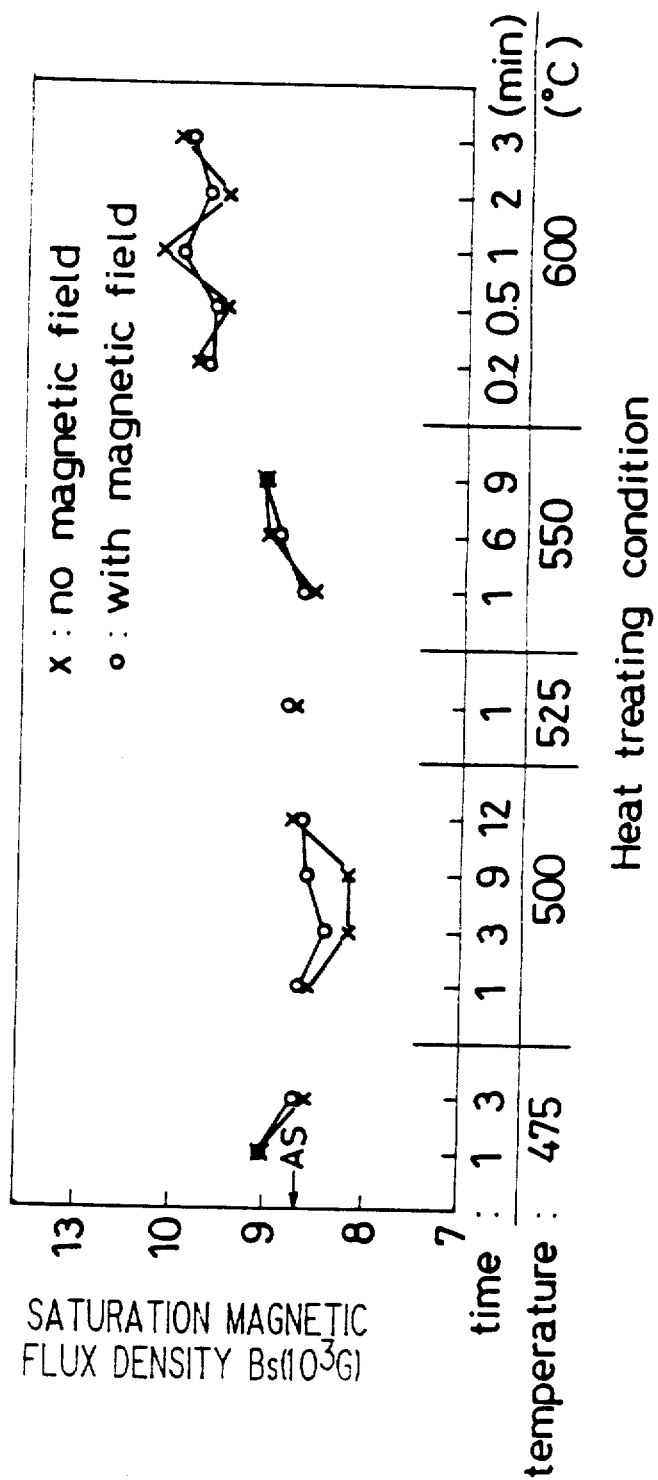
Figure 9C:
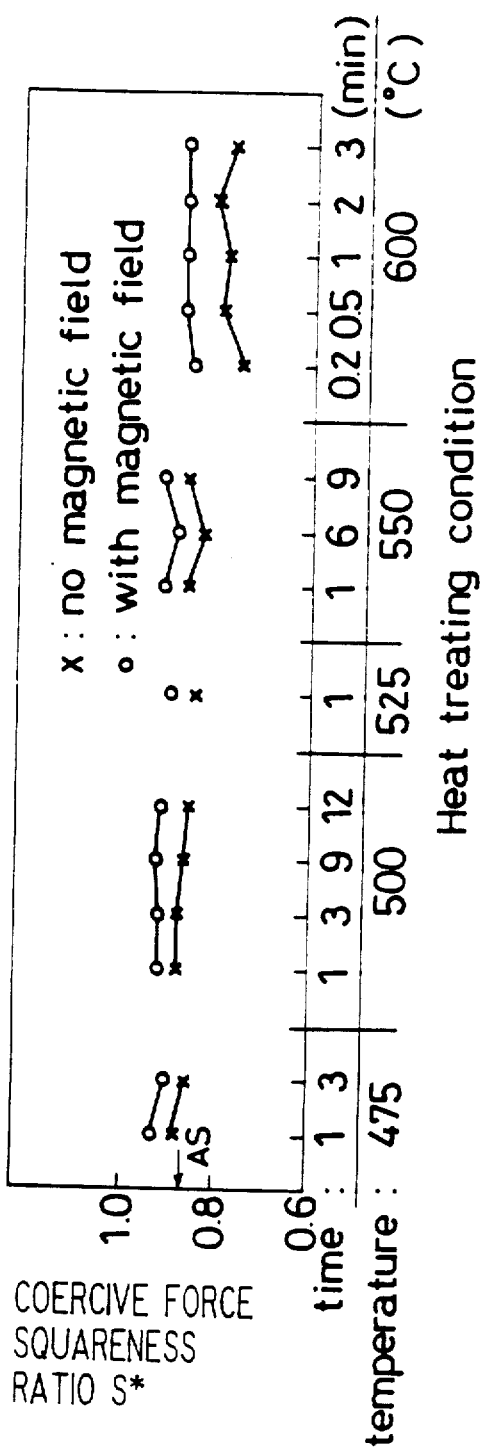
Figure 9D:
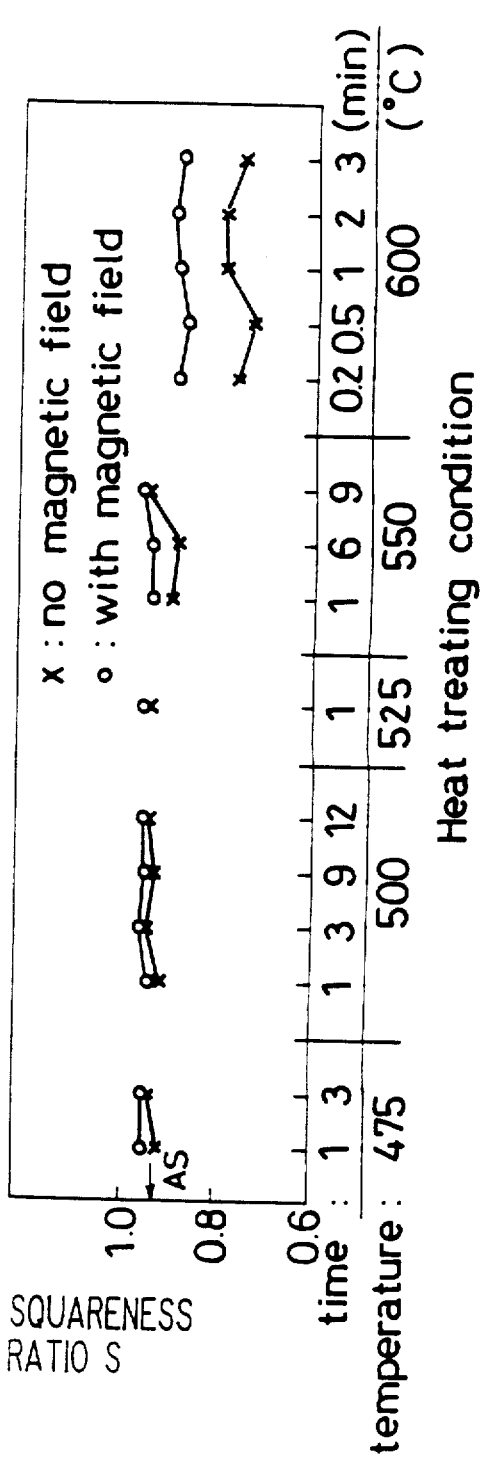
Figure 10A:
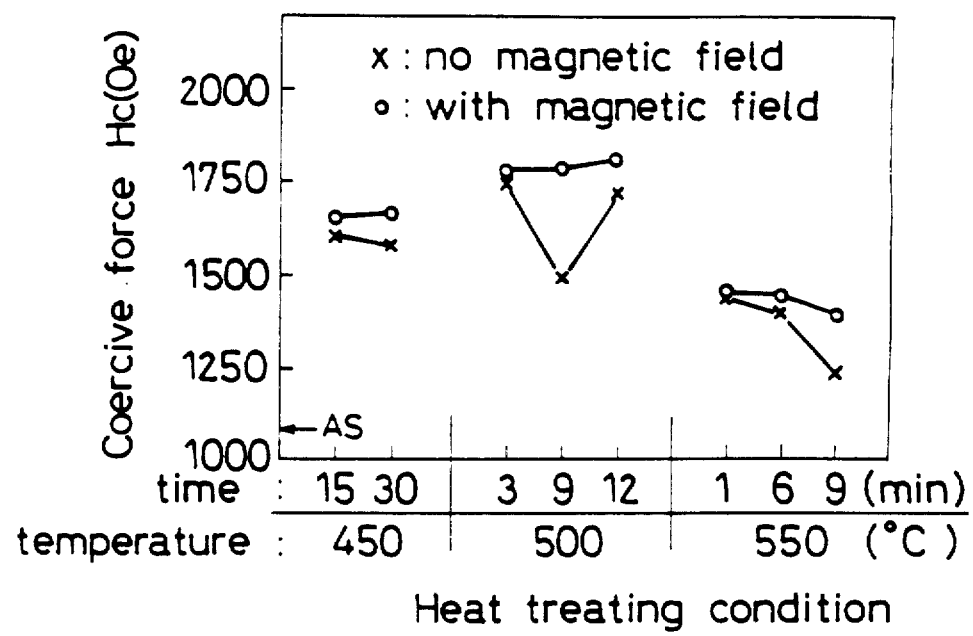
Figure 10B:
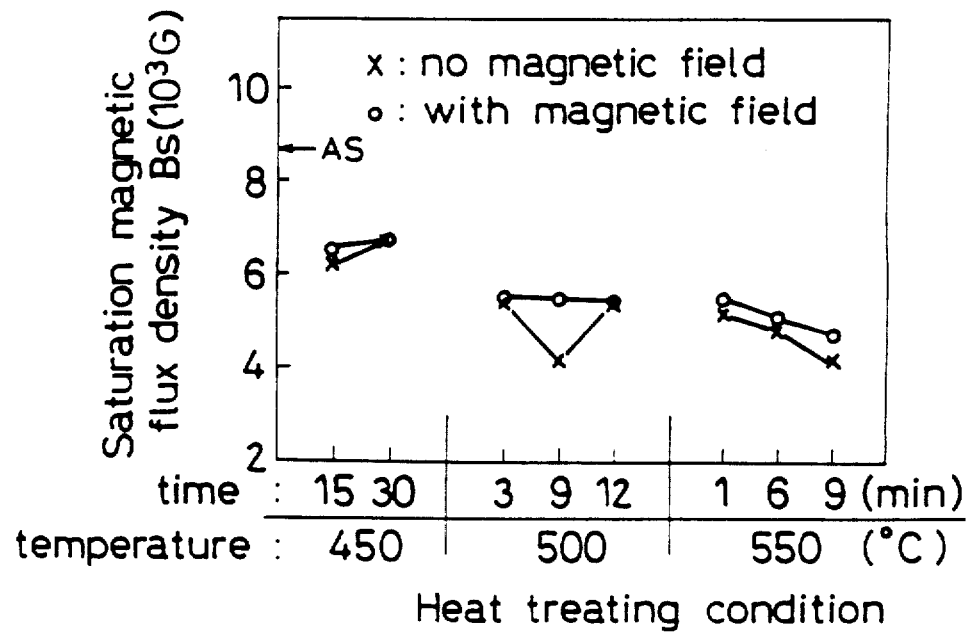
Figure 10C:
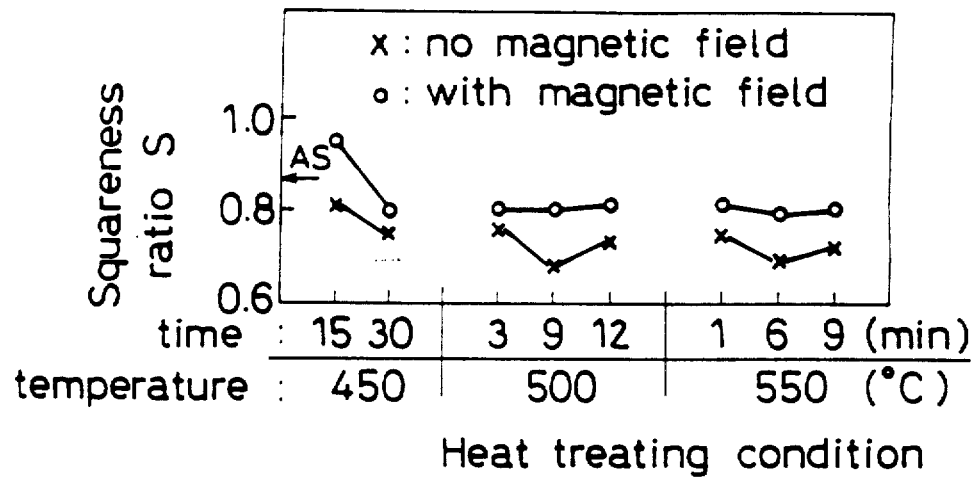
Figure 10D:
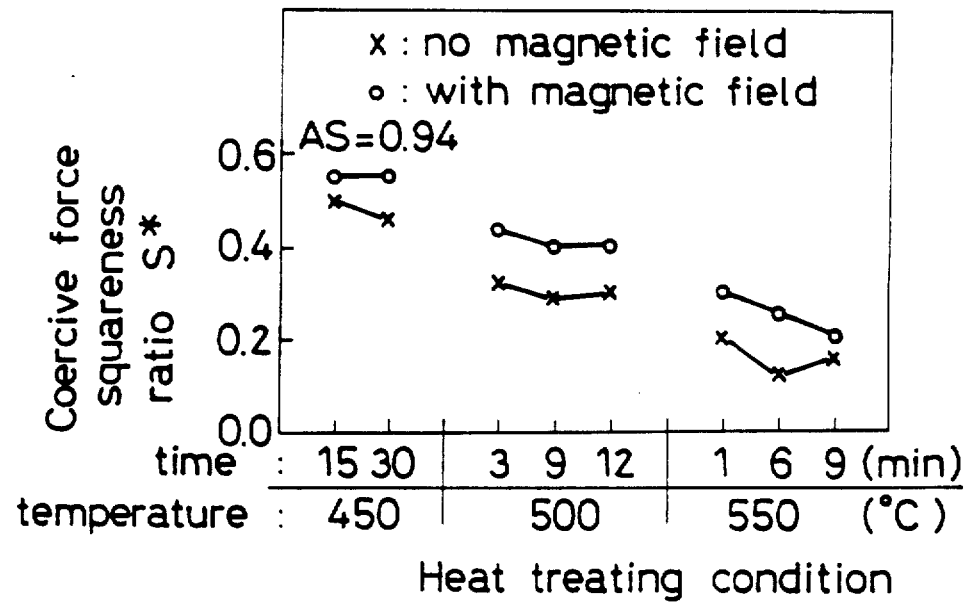
Figure 11A:
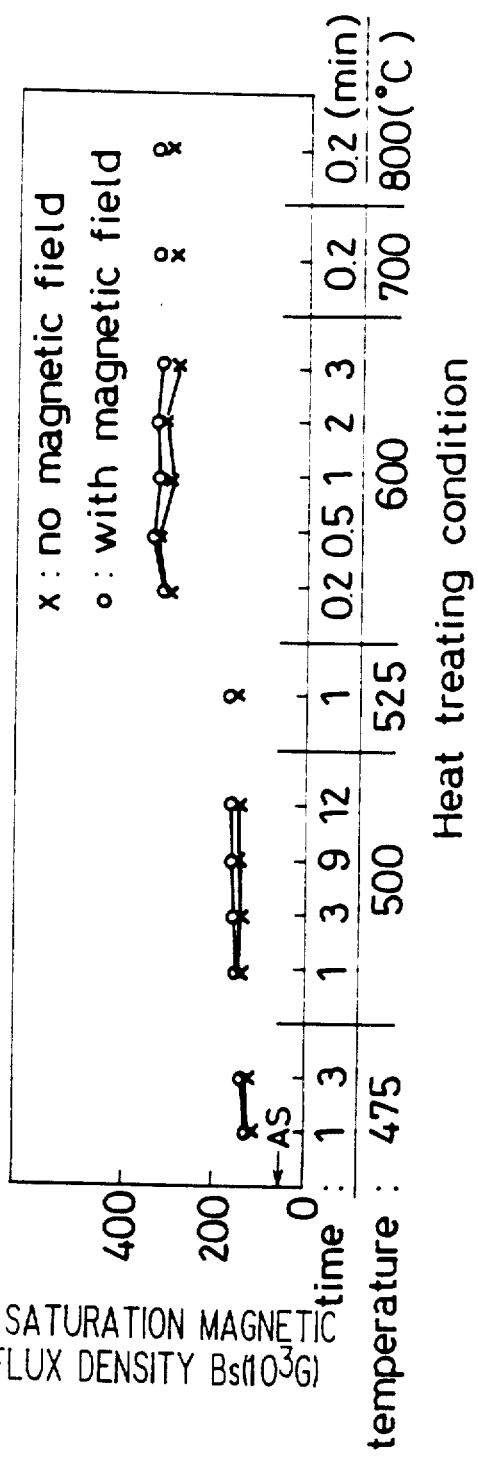
Figure 11B:
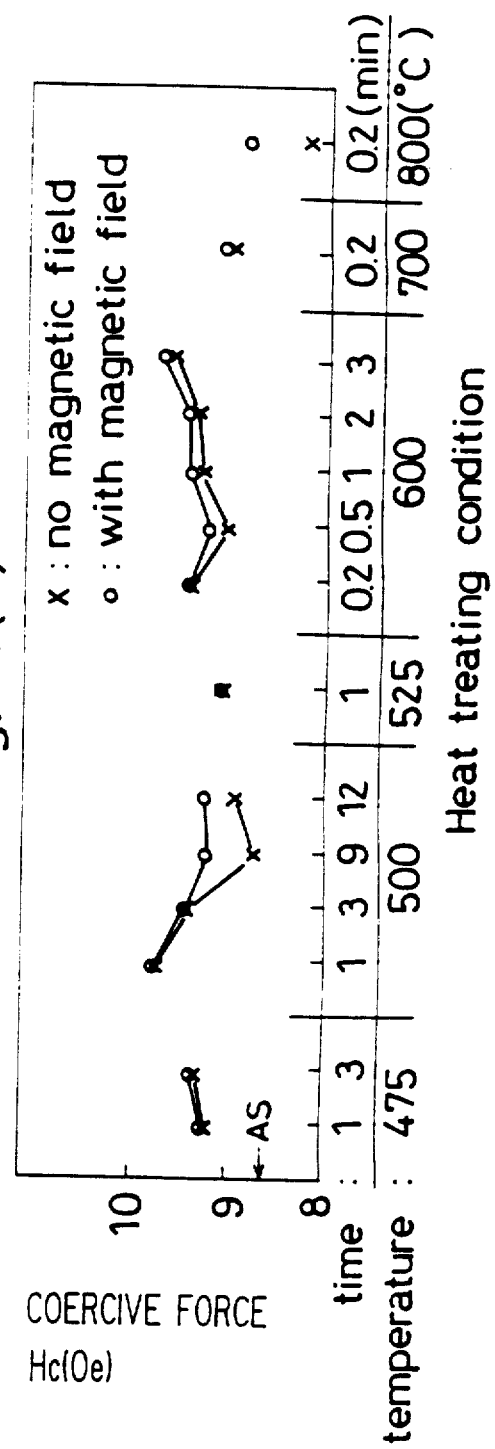

The results are shown in FIG. 9(a) to FIG. 9(d). FIG. 9(a) is a view illustrating the relationship between the conditions for the heat treatment and the coercive force Hc, FIG. 9(b) is a view illustrating the relationship between the condition for the heat treatment and the saturation magnetic flux density Bs, FIG. 9(c) is a view illustrating the relationship between the condition for the heat treatment and the squareness ratio S and FIG. 9(d) is a view illustrating the relationship between the conditions for the heat treatment and the coercive force squareness ratio S*. In each of the figures, the reference AS shows the measured value in the case not applying the heat treatment. For the comparison, the results of Example 2 in which the heat treatment was applied under no magnetic field are shown together in FIG. 9(a) to FIG. 9(d).

As can be seen from FIG. 9(a), magnetic discs with increased coercive force Hc could be obtained within a range of heating temperature from 500° to 550° C. is the conditions of this example. Further, as can be seen from FIG. 9(c) and FIG. 9(d), increased squareness ratio S and the coercive squareness ratio S* could be obtained in the case of applying the heat treatment under the magnetic field as compared with the case of not applying the heat treatment and the case of merely applying the heat treatment with no application of the magnetic field. In this example, the heat treatment is applied in vacuum in a state where the magnetic field is generated, but it may be conducted in an inert gas atmosphere such as Ar gas instead of vacuum atmosphere.

EXAMPLE 9

Magnetic discs were manufactured in the same way as in Example 5 except for applying the heat treatment under a magnetic field at an intensity of 5000 Oe and directed to the circumferential direction of the disc after forming the Cr underlayer 2 and the CoNiCr magnetic layer 3 and before forming the C protecting and lubricating layer 4 on the carbon substrate 1. Heating temperature and the heating time are shown in FIG. 10(a).

The coercive force Hc, the saturation magnetic flux density Bs, the squareness ratio S and the coercive force squareness ratio S* of the resultant magnetic discs were measured respectively by VSM in the same way as in Example 8. The results are shown in FIG. 10(a) to FIG. 10(d). FIG. 10(a) is a view illustrating the relationship between the conditions for the heat treatment and the coercive force Hc, FIG. 10(b) is a view illustrating the relationship between the conditions for the heat treatment and the saturation magnetic flux density Bs, FIG. 10(c) is a view illustrating the relationship between the conditions for the heat treatment and the squareness ratio S and FIG. 10(d) is a view illustrating the relationship between the conditions for the heat treatment and the coercive squareness ratio S*. In each of the figures, the reference As shows the measured value in the case not applying the heat treatment.

Figure 10A:
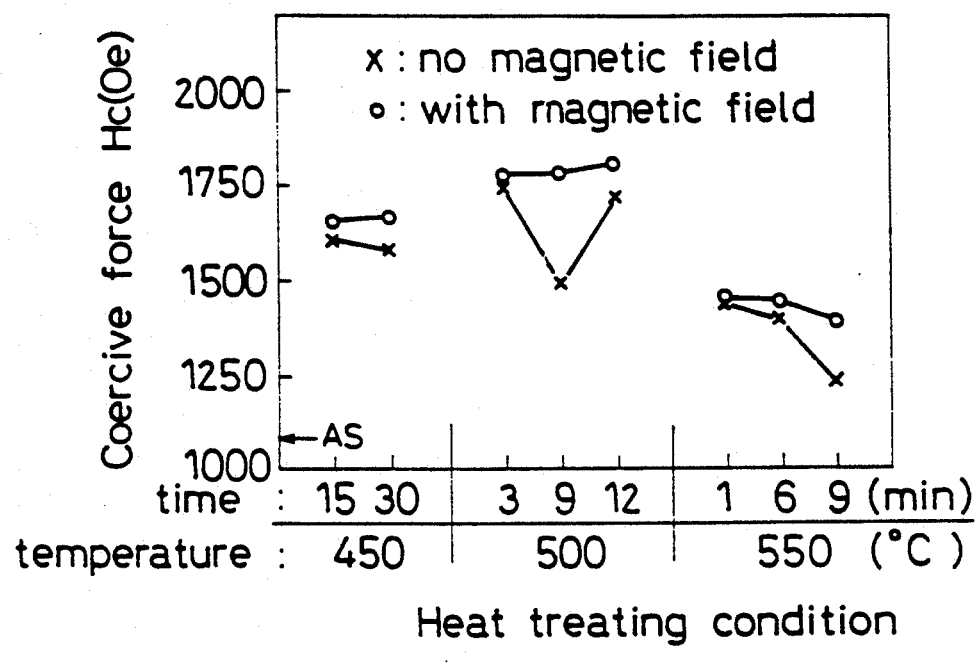
FIG. 10(a), 10(b), 10(c) and 10(d) are views illustrating magnetic properties under each of heat treating conditions for a magnetic disc obtained by Example 9
Figure 10B:
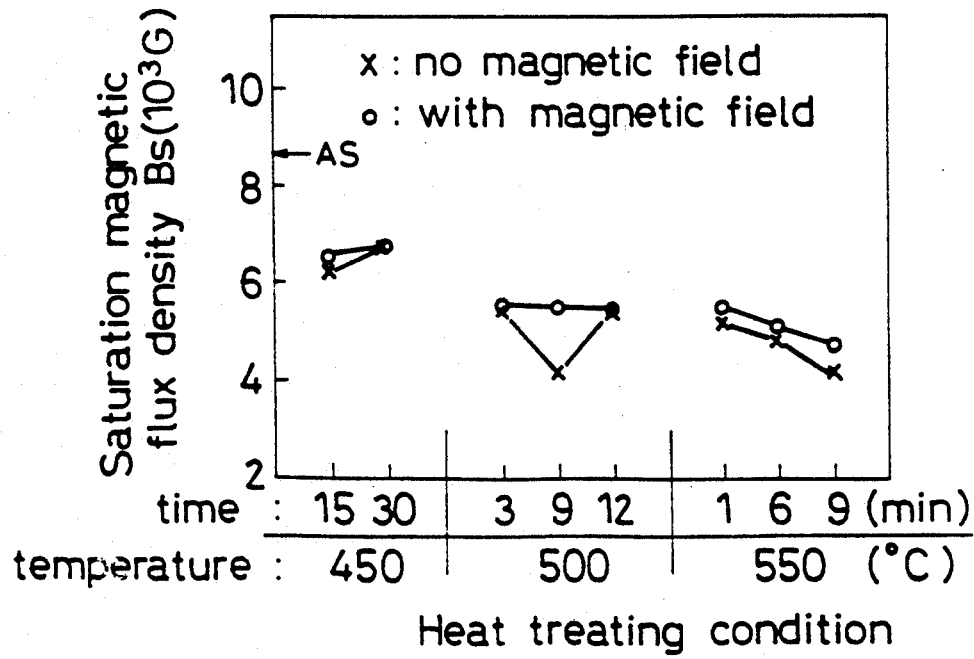
Figure 10C:
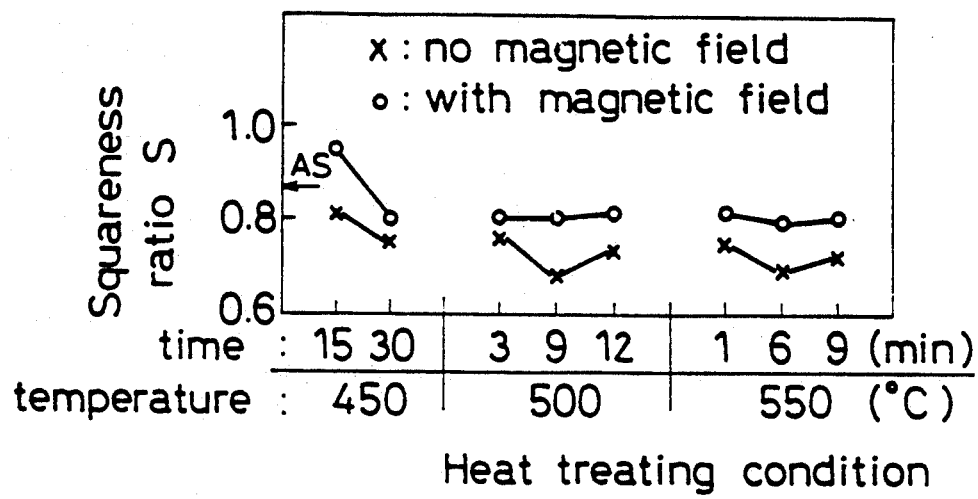
Figure 10D:
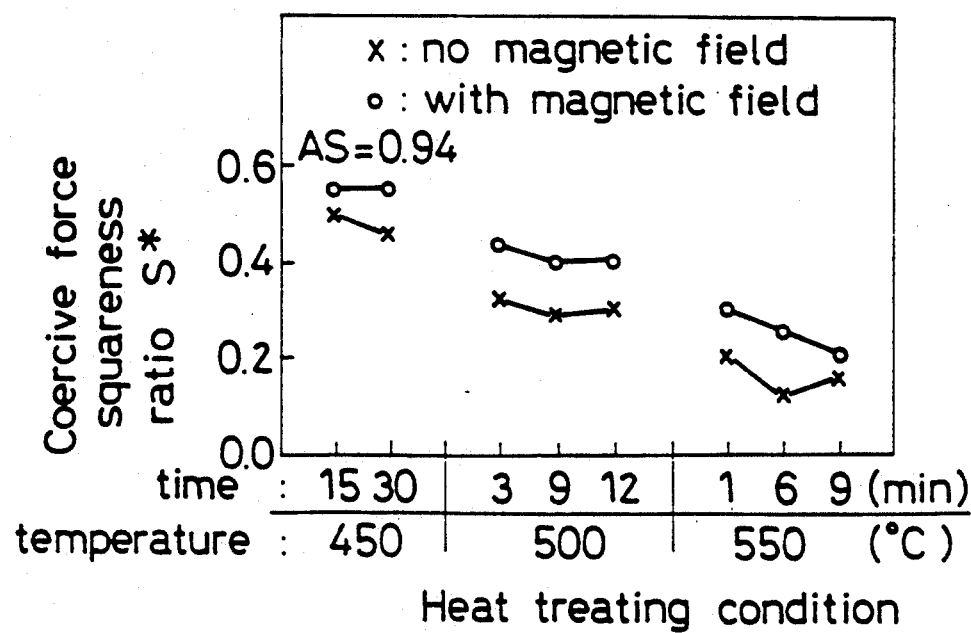

As can be seen from FIG. 10(a), magnetic discs with the coercive force Hc increased by the heat treatment could be obtained. Further, as shown in FIG. 10(c), improvement was in the squareness ratio S observed by conducting the heat treatment in the magnetic field. In the case of applying the heat treatment in the atmosphere air, a trend was observed in which the saturation magnetic flux density Bs and the residual magnetic flux density Br were liable to be reduced due to the excess oxidizing phenomenon of the CoNiCr magnetic layer 3.

EXAMPLE 10

Magnetic discs were manufactured in the same way as in Example 8 except for not forming the Cr underlayer 2. The heating temperature and the heating time are shown in FIG. 11(a).

The coercive force Hc, the saturation magnetic flux density Bs, the squareness ratio S and the coercive force squareness ratio S* of the resultant magnetic discs were measured respectively by VSM. The results are shown in FIG. 11(a) to FIG. 11(d). FIG. 11(a) is a view illustrating the relationship between the conditions for the heat treatment and the coercive force Hc, FIG. 11(b) is a view illustrating the relationship between the condition for the heat treatment and the saturation magnetic flux density Bs, FIG. 11(c) is a view illustrating the relationship between the condition for the heat treatment and the squareness ratio S and FIG. 9(d) is a view illustrating the relationship between the conditions for the heat treatment and the coercive squareness ratio S*. In each of the figures, the reference AS shows the measured value in the case not applying the heat treatment.

Figure 11A:
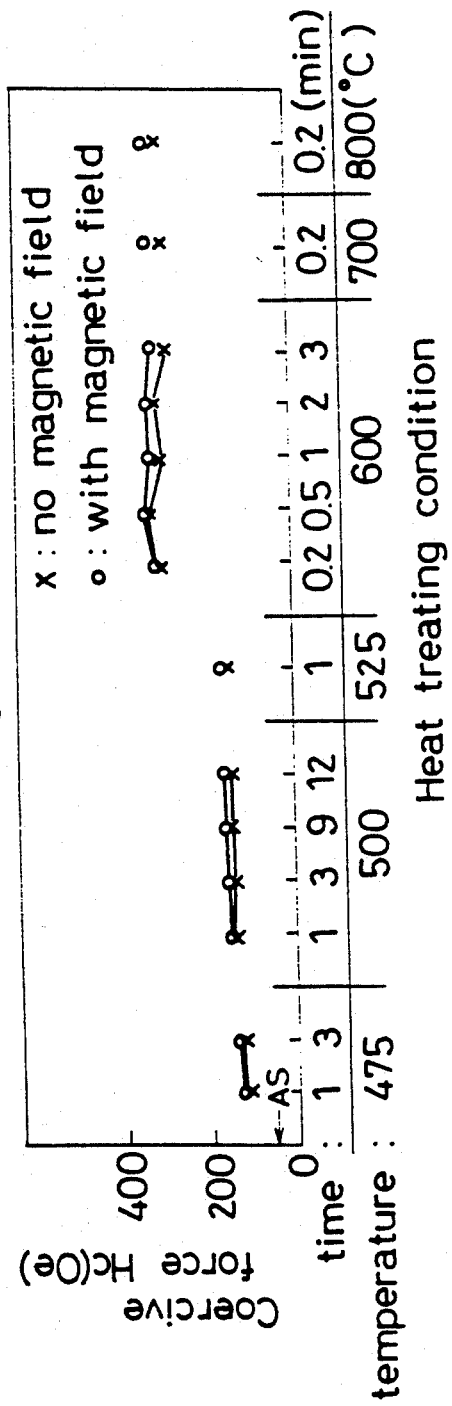
Figure 11B:
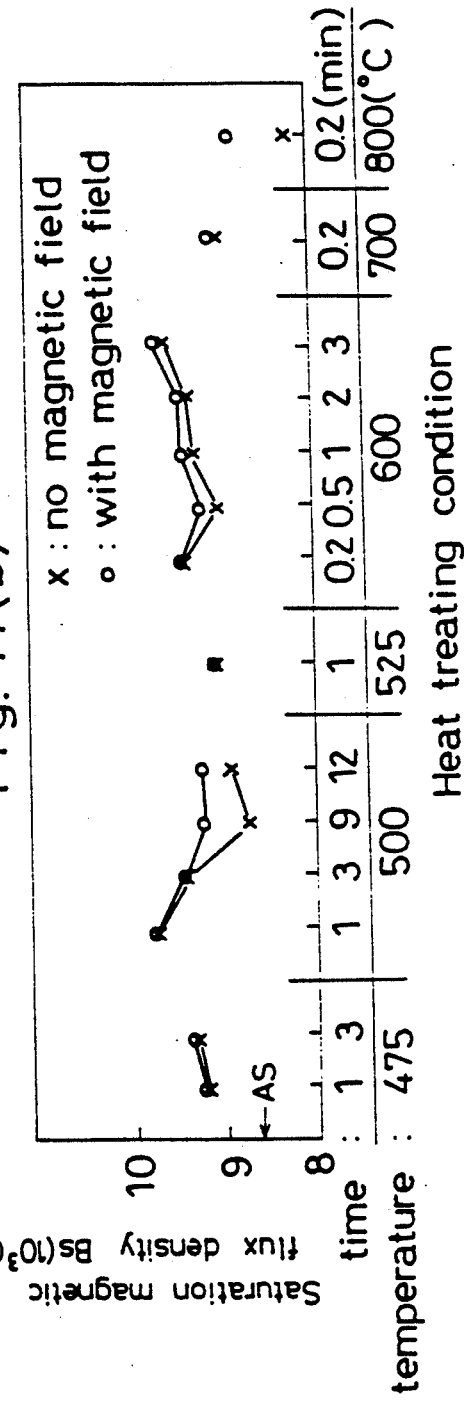
Figure 3:
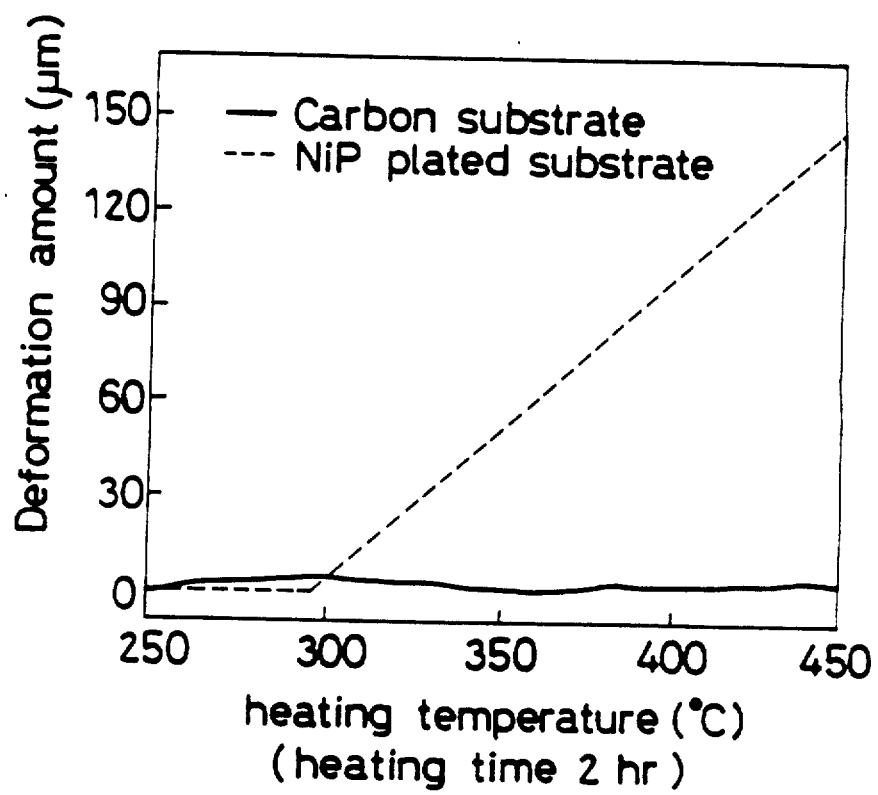

As can be seen from FIG. 11(a), magnetic discs having the coercive force Hc increased along with the elevation of the heating temperature could be obtained. Further, as shown in FIG. 11(c), FIG. 11(d), improved squareness ratio and coercive squareness ratio S* could be obtained by the heat treatment applied in the magnetic field.

INDUSTRIAL APPLICABILITY

According to the present invention, a magnetic recording medium having higher coercive force than usual and suitable to increase force recording density can be provided by using a simple means of heat treatment.

Further, if a method of applying heat treatment in a magnetic field is employed for manufacturing magnetic discs, magnetic discs of improved squareness ratio can be obtained since the directions of the magnetic moments in the magnetic domains of the Co-based alloy magnetic layer can be aligned in the circumferential direction of the disc. Accordingly, it can provide an economical merit that a generally used film-forming apparatus such as a sputtering system can be used as it is and it can contribute to increase the capacity of the

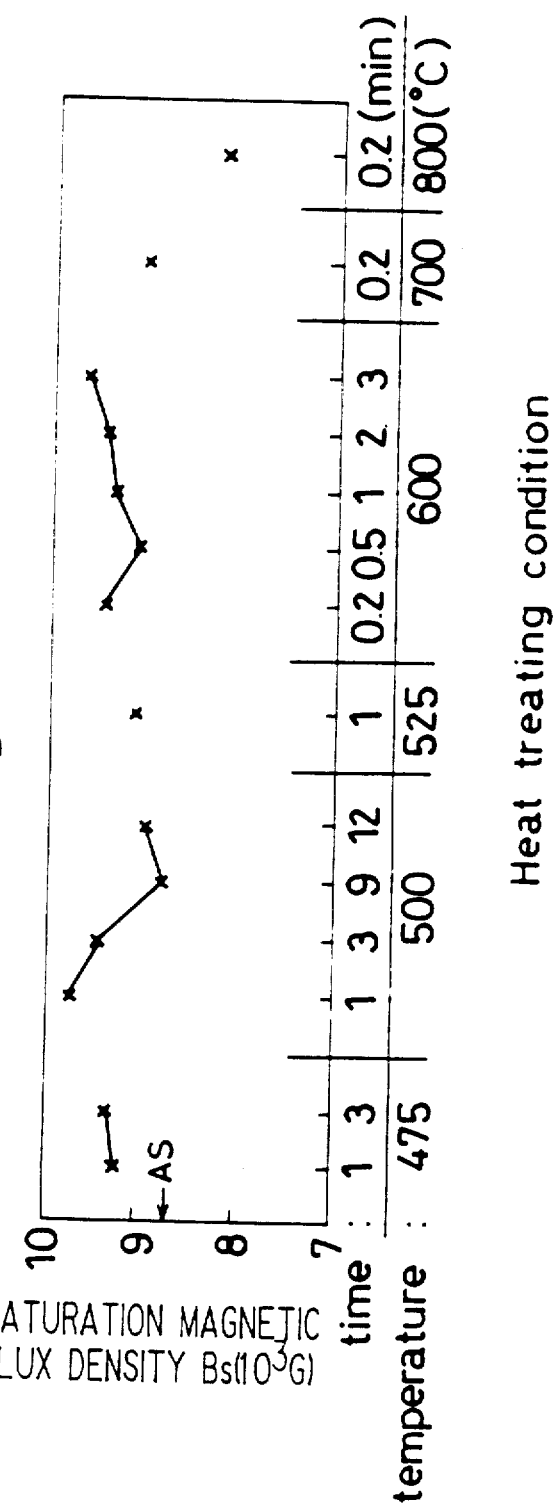

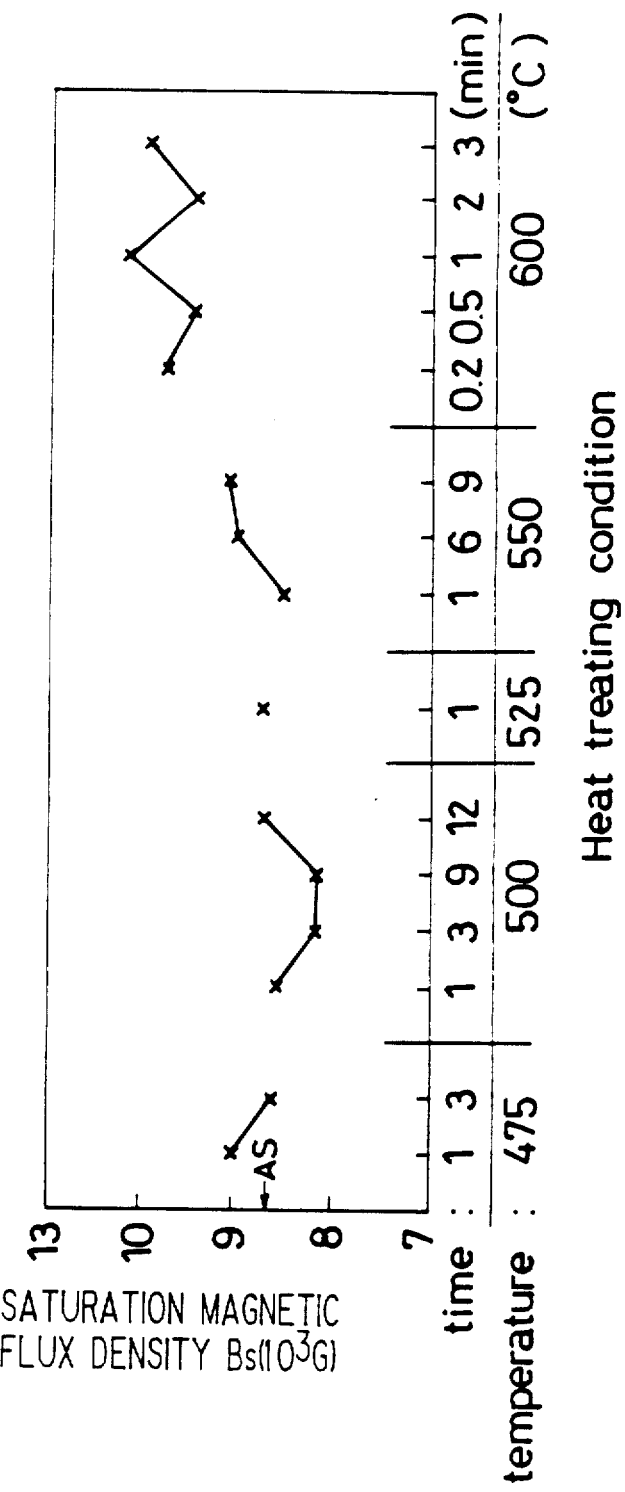

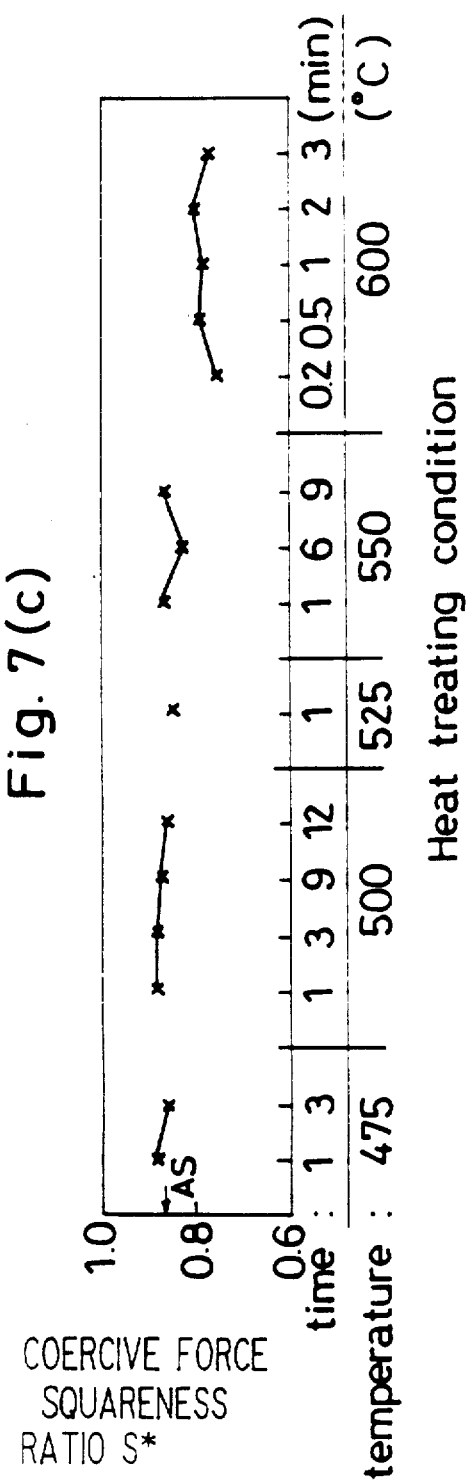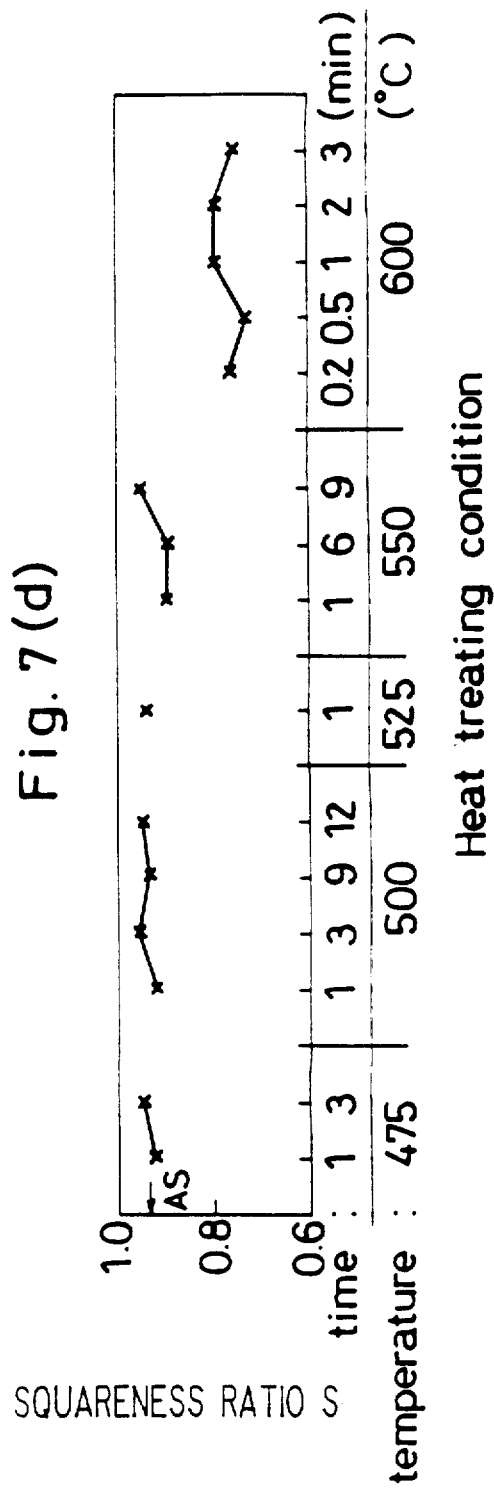

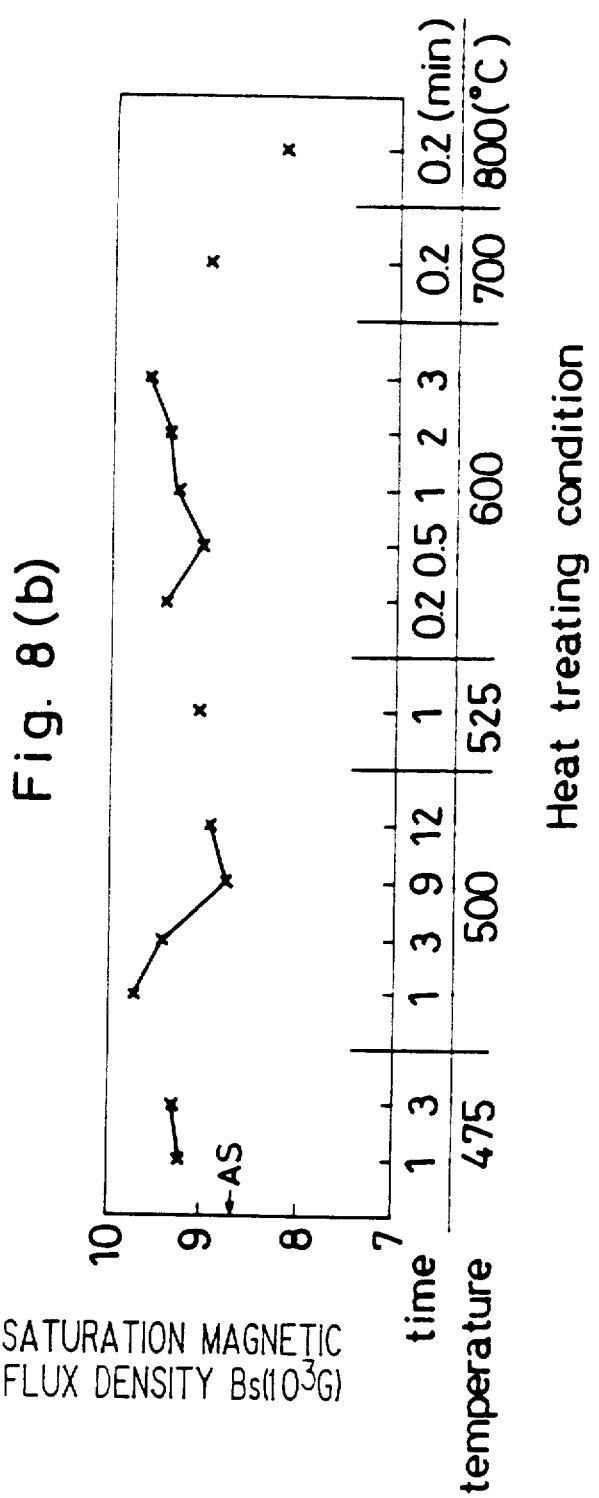

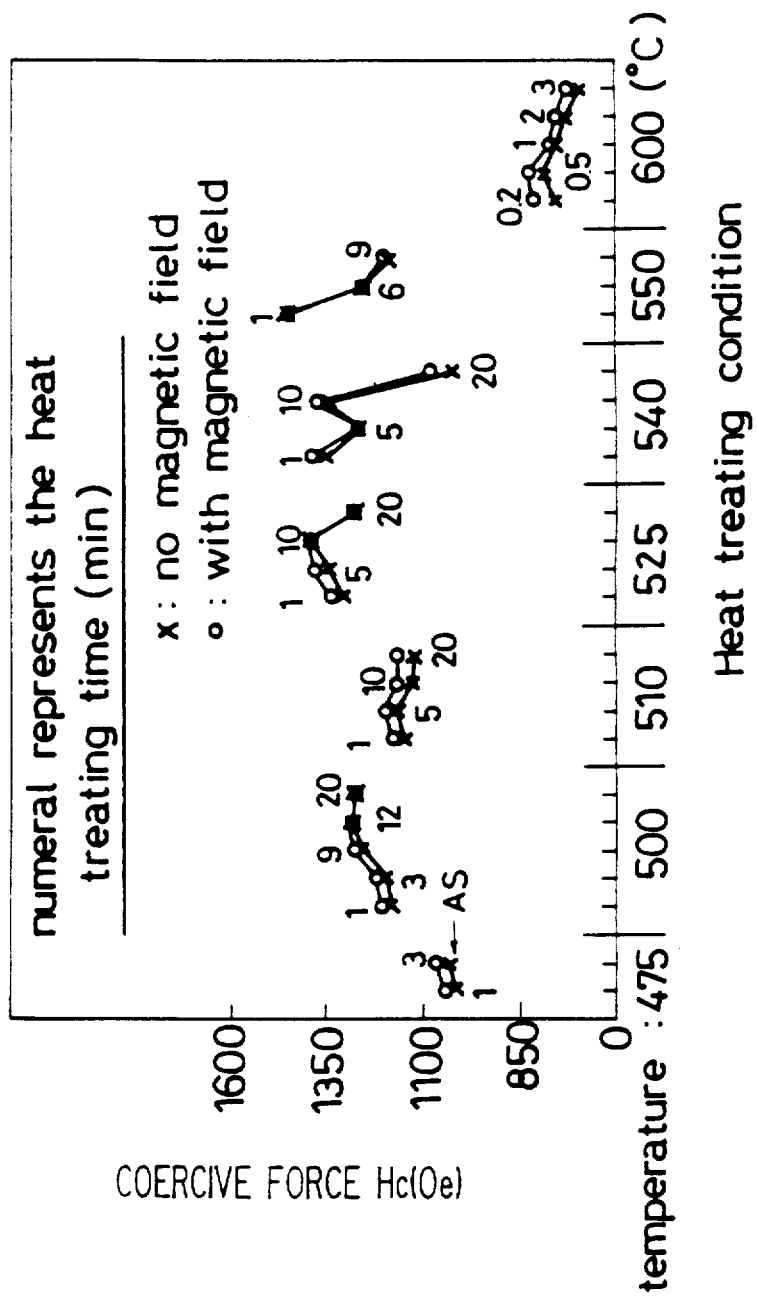

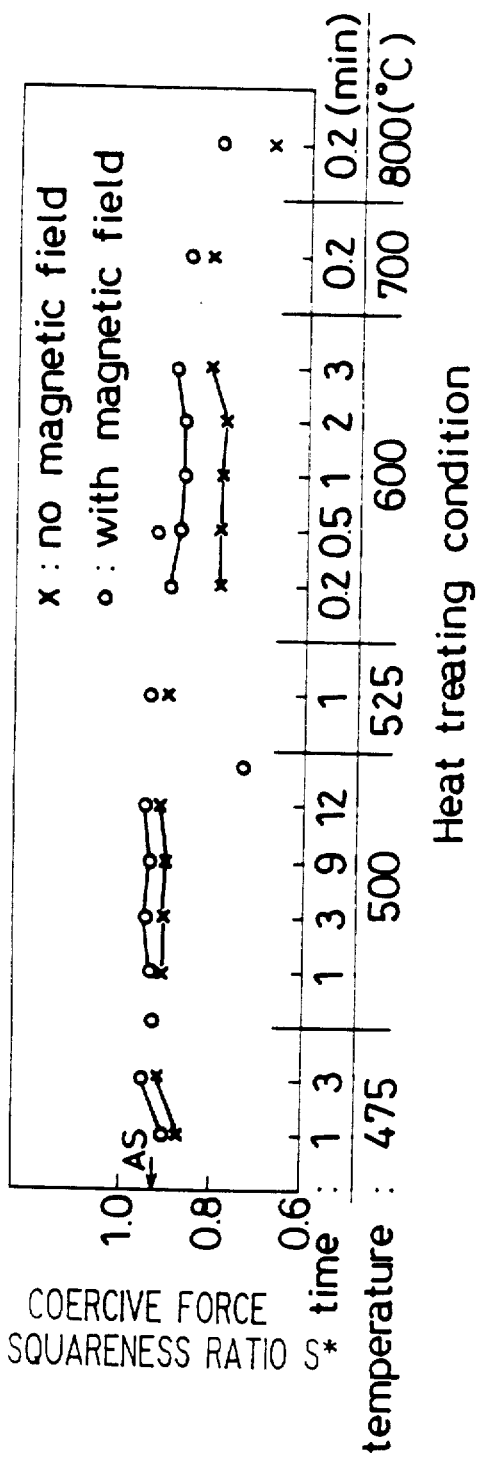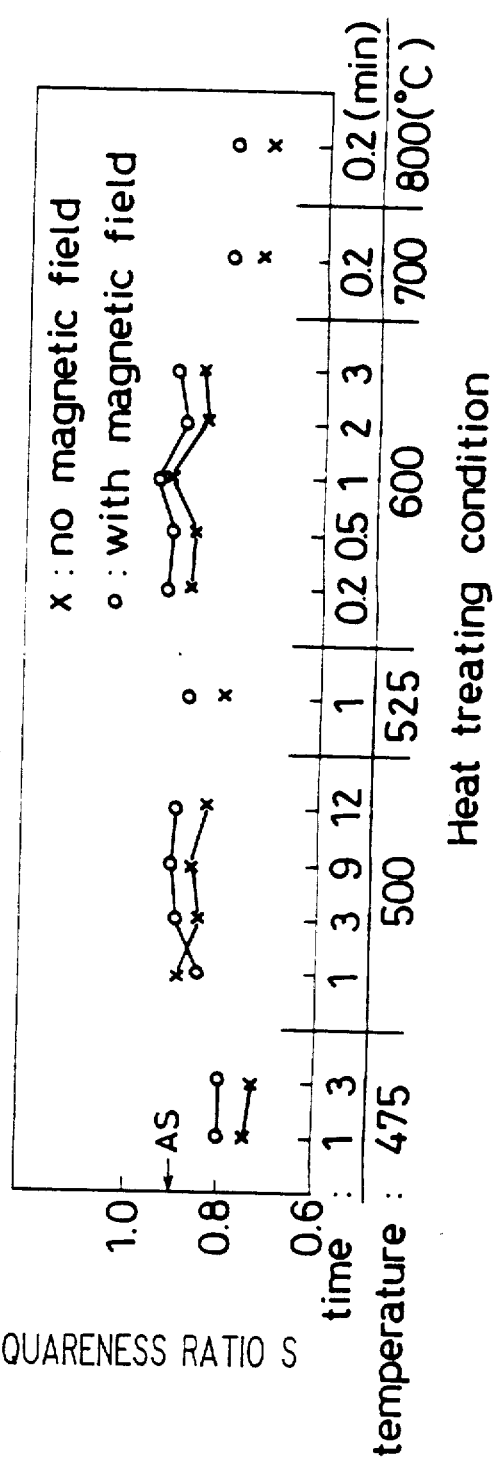

We claim:

1. A method of manufacturing a magnetic recording medium in which a magnetic layer is formed on a carbon substrate, wherein a magnetic layer comprising a Co-based alloy and a protecting and lubricating layer are successively formed on the carbon substrate and then a heat treatment is applied at a temperature from 250° to 1450° C.

2. A method of manufacturing a magnetic recording medium as defined in claim 1, wherein the Co-based alloy contains Cr.

3. A method of manufacturing a magnetic recording medium as defined in claim 1 or 2, wherein an underlayer comprising Cr is formed on the carbon substrate before forming the magnetic layer comprising the Co-based alloy.

4. A method of manufacturing a magnetic recording medium as defined in claim 1 wherein the heat treatment is applied under the formation of a magnetic field directed to the circumferential direction of the disc.

5. A method of manufacturing a magnetic recording medium as defined in claim 1, wherein said heat treatment is applied in a vacuum.

6. A method of manufacturing a magnetic recording medium as define in claim 1, wherein said heat treatment is conducted in an inert gas atmosphere.

7. A method of manufacturing a magnetic recording medium as defined in claim 1, wherein said heat treatment is conducted for a time ranging from 0.2-20 minutes at a temperature of 500°-800° C.

8. A method of manufacturing a magnetic recording medium as defined in claim 1, wherein said heat treatment is conducted at a temperature from 350°-800° C.

9. A method of manufacturing a magnetic recording medium in which a magnetic layer is formed on a carbon substrate, wherein a magnetic layer comprising a Co-based alloy is formed on the carbon substrate, a heat treatment is applied at a temperature from 250° to 1450° C. and then a protecting and lubricating layer is formed.

10. A method of manufacturing a magnetic recording medium as define in claim 9, wherein the Co-based alloy contains Cr.

11. A method of manufacturing a magnetic recording medium as defined in claim 9 or 10, wherein an underlayer comprising Cr is formed on the carbon substrate before forming the magnetic layer comprising the Co-based alloy.

12. A method of manufacturing a magnetic recording medium as define in claim 9, wherein said heat treatment is applied in a vacuum.

13. A method of manufacturing a magnetic recording medium as defined in claim 9, wherein said heat treatment is conducted in an inert gas atmosphere.

14. A method of manufacturing a magnetic recording medium as defined in claim 9, wherein said heat treatment is conducted for a time ranging from 0.2-20 minutes at a temperature of 500°-800° C.

15. A method of manufacturing a magnetic recording medium as defined in claim 9, wherein said heat treatment is conducted at a temperature from 350°-800° C.

16. A method of increasing coercive force or the squareness ratio of a magnetic recording medium in which a magnetic layer is formed on a carbon substrate,
wherein a magnetic layer comprising a Co-based alloy and a protecting and lubricating layer are successively formed on the carbon substrate and then a heat treatment is applied at a temperature of from 250°-1450° C., or
wherein a magnetic layer comprising a Co-based alloy is formed on the carbon substrate, a heat treatment is applied at a temperature of from 250°-1450° C. and then a protecting and lubricating layer are formed on said magnetic layer.

17. A method of manufacturing a magnetic recording medium as defined in claim 16, wherein said heat treatment is applied in a vacuum.

18. A method of manufacturing a magnetic recording medium as defined in claim 16, wherein said heat treatment is conducted in an inert gas atmosphere.

19. A method of manufacturing a magnetic recording medium as defined in claim 16, wherein said heat treatment is conducted for a time ranging from 0.2-20 minutes at a temperature of 500°-800° C.

20. A method of manufacturing a magnetic recording medium as defined in claim 16, wherein said heat treatment is conducted at a temperature from 350°-800° C.

* * * * *

UNITED STATES PATENT AND TRADEMARK OFFICE
CERTIFICATE OF CORRECTION

PATENT NO. : 5,252,367
DATED : October 12, 1993
INVENTOR(S) : Motoharu Sato et al It is certified that error appears in the above-indentified patent and that said Letters Patent is hereby corrected as shown below:

On the title page, item [75] Inventors: the second inventor's name should read --Kazuo Muramatsu--.

In the drawings, sheets 1-21 consisting of Figs. 1-11 should be deleted to be replaced with the corrected Figs. 1-11, as shown on the attached sheets.

Signed and Sealed this

Twenty-first Day of June, 1994

Attest:

BRUCE LEHMAN

*Attesting Officer*     *Commissioner of Patents and Trademarks*

Figure 1B:
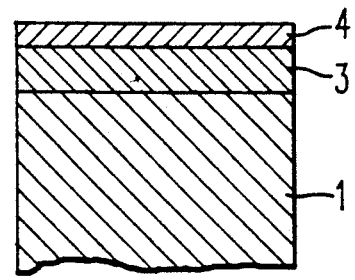

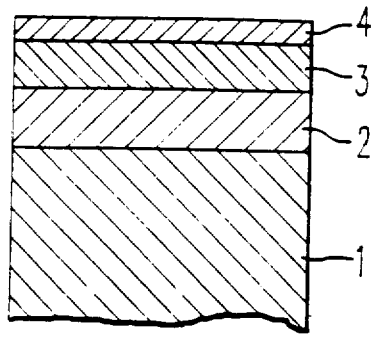
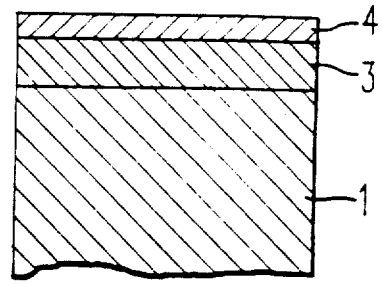
FIG. 1(a)    FIG. 1(b)
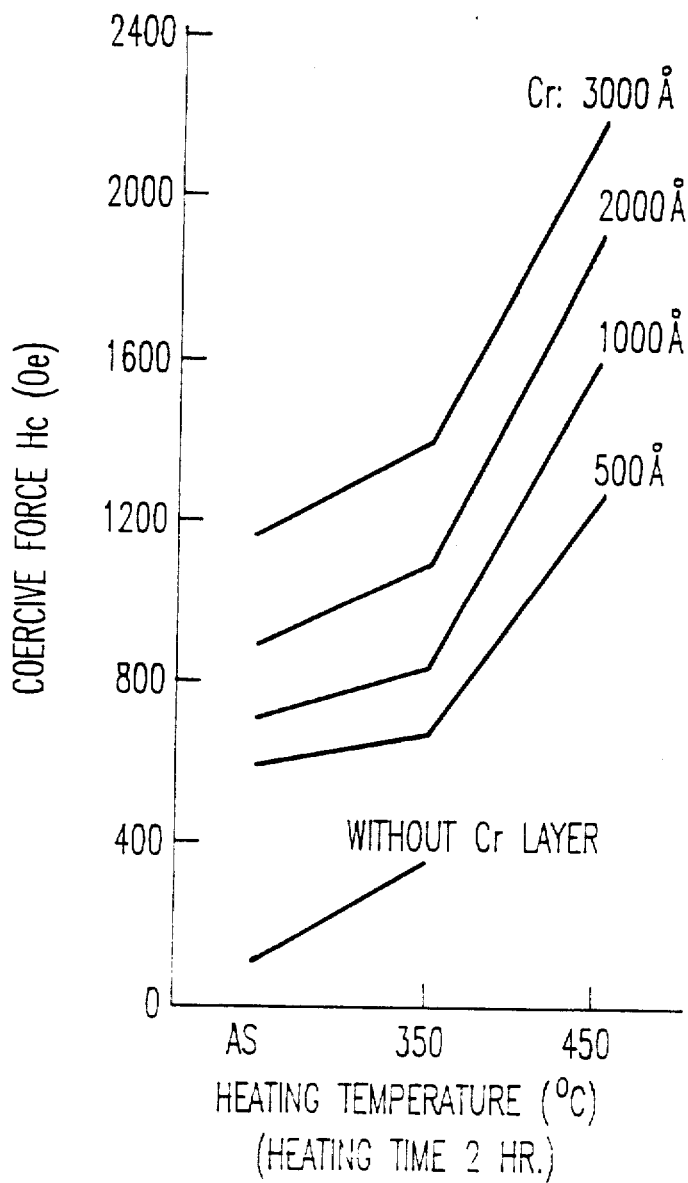
FIG. 2